US007993231B2

(12) United States Patent
Shimizu et al.

(10) Patent No.: US 7,993,231 B2
(45) Date of Patent: Aug. 9, 2011

(54) HYDRAULIC CONTROL DEVICE FOR AUTOMATIC TRANSMISSION

(75) Inventors: Tetsuya Shimizu, Anjo (JP); Kenichi Tsuchida, Anjo (JP); Akitomo Suzuki, Anjo (JP); Kazunori Ishikawa, Anjo (JP); Masamichi Yamaguchi, Anjo (JP); Satoshi Nishio, Hekinan (JP)

(73) Assignee: Aisin AW Co., Ltd., Anjo (JP)

( * ) Notice: Subject to any disclaimer, the term of this patent is extended or adjusted under 35 U.S.C. 154(b) by 481 days.

(21) Appl. No.: 12/292,888

(22) Filed: Nov. 28, 2008

(65) Prior Publication Data

US 2009/0143180 A1    Jun. 4, 2009

(30) Foreign Application Priority Data

Nov. 30, 2007 (JP) ................................. 2007-311250
Aug. 20, 2008 (JP) ................................. 2008-212217

(51) Int. Cl.
*F16H 61/00* (2006.01)
(52) U.S. Cl. .......................... 475/127; 475/120; 475/122
(58) Field of Classification Search .................. 475/118, 475/120, 121, 122, 127
See application file for complete search history.

(56) References Cited

U.S. PATENT DOCUMENTS

| 5,630,772 | A | * | 5/1997 | Tsukamoto et al. | ............ 477/95 |
| 5,653,660 | A | * | 8/1997 | Tsukamoto et al. | ......... 477/143 |
| 5,700,226 | A | * | 12/1997 | Droste | .......................... 477/156 |
| 5,749,802 | A | * | 5/1998 | Tanahashi et al. | ............ 475/120 |
| 5,772,550 | A | * | 6/1998 | Kamada et al. | ............... 475/120 |
| 6,302,822 | B1 | | 10/2001 | Suzuki et al. | |
| 6,398,684 | B1 | | 6/2002 | Kaizu | |
| 2007/0161448 | A1 | | 7/2007 | Sato et al. | |
| 2007/0161449 | A1 | | 7/2007 | Hayashi et al. | |

FOREIGN PATENT DOCUMENTS

| JP | A-2000-240776 | 9/2000 |
| JP | A-2001-090829 | 4/2001 |
| JP | A-2007-177932 | 7/2007 |
| JP | A-2007-177933 | 7/2007 |

* cited by examiner

*Primary Examiner* — Ha D. Ho
(74) *Attorney, Agent, or Firm* — Oliff & Berridge, PLC

(57) ABSTRACT

A hydraulic control device for an automatic transmission includes a first solenoid valve, a second solenoid valve, a third solenoid valve, a preliminary shift speed switching valve, and a hydraulic pressure supply switching valve. A second friction engagement element is engaged at high speed side shift speeds, a low speed that is one of low speed side shift speeds is achieved by engagement of a first friction engagement element and a third friction engagement element, and a high speed that is one of the high speed side shift speeds is achieved by engagement of a second friction engagement element and the third friction engagement element.

8 Claims, 5 Drawing Sheets

FIG. 2

|   | C-1 | C-2 | C-3 | B-1 | B-2 | F-1 |
|---|---|---|---|---|---|---|
| P |   |   |   |   |   |   |
| REV |   |   | ○ |   | ○ |   |
| N |   |   |   |   |   |   |
| 1ST | ○ |   |   |   | (○) | ○ |
| 2ND | ○ |   |   | ○ |   |   |
| 3RD | ○ |   | ○ |   |   |   |
| 4TH | ○ | ○ |   |   |   |   |
| 5TH |   | ○ | ○ |   |   |   |
| 6TH |   | ○ |   | ○ |   |   |

(O) INDICATES THAT ENGINE BRAKE IS APPLIED

HYDRAULIC CONTROL DEVICE FOR AUTOMATIC TRANSMISSION

The disclosure of Japanese Patent Application No. 2007-311250 filed on Nov. 30, 2007 and Japanese Patent Application No. 2008-212217 filed on Aug. 20, 2008 including the specification, drawings and abstract is incorporated herein by reference in its entirety.

BACKGROUND OF THE INVENTION

The present invention relates to a hydraulic control device for an automatic transmission.

Generally, in a multi-stage automatic transmission installed in vehicles, each shift speed is achieved by controlling the rotating state of each rotating element included in a speed change gear mechanism based on the engaged state of a plurality of friction engagement elements. The engaged state of these friction engagement elements is controlled by electrically adjusting the engaging pressure using a solenoid valve and supplying the engaging pressure to a hydraulic servo of each friction engagement element.

In the automatic transmission, when a failure occurs where no electricity is supplied to the solenoid valve, or a so-called solenoid-all-off state, electrical shift control using the solenoid valve is impossible. The solenoid-all-off state occurs, for example, when the control unit (ECU) is down, battery wiring is broken, and a short-circuit occurs.

To solve this problem, Japanese Patent Application Publication No. JP-A-2001-90829 proposes that, when such solenoid-all-off state occurs during running (in a forward range), two types of shift speeds are achieved in accordance with the shift speed before the occurrence of the solenoid-all-off state without using the electrical pressure regulation control of the solenoid valve, thus securing continuous running performance. More specifically, the device in Japanese Patent Application Publication No. JP-A-2001-90829 is structured such that, if the solenoid-all-off state occurs between a forward first speed and a forward third speed, the forward third speed is achieved, and if the solenoid-all-off state occurs between a forward fourth speed and a forward sixth speed, the forward sixth speed is achieved. Therefore, a low-speed running performance is secured if the solenoid-all-off state occurs during low-speed running, while high-speed running performance is secured if the solenoid-all-off state occurs during high-speed running. The device in Japanese Patent Application Publication No. JP-A-2001-90829 is structured such that forward third speed is achieved if the engine is restarted after the vehicle is stopped and the engine is stopped after the occurrence of the solenoid-all-off state, thereby making it possible to restart the vehicle, which is referred to as limp-home function.

The device disclosed in Japanese Patent Application Publication No. JP-A-2001-90829 is provided with three valves in total: a fail-safe shift valve (VA) to switch the shift speed to achieve two types of shift speeds (forward sixth speed, forward third speed) when the solenoid-all-off state occurs; a high shift speed storage shift valve (VB) to store the state of high speed and output hydraulic pressure to the fail-safe shift valve at a high speed; and a high shift speed cancel shift valve (VC) to cancel the storage state of the high speed in the high shift speed storage shift valve (or four valves if an abnormality detection solenoid valve (SE) to change the signal pressure between normal time and failure time is included).

SUMMARY OF THE INVENTION

The three valves and a complicated oil passage structure to achieve their functions are not required during normal running unless the solenoid-all-off state occurs. As a fail-safe device prepared in an emergency, the structure lacks compactness and the number of valves is large, making it expensive.

To address this, an object of the present invention is to provide a hydraulic control device for an automatic transmission that is capable of promoting compactness and cost reduction while achieving, when a failure resulting in non-energizing occurs, low speed or high speed in accordance with the shift speed before the occurrence of the failure. The present invention can also achieve various other advantages.

According to an exemplary aspect of the invention, a hydraulic control device for an automatic transmission includes a first solenoid valve that supplies a first operating hydraulic pressure to a hydraulic servo of a first friction engagement element; a second solenoid valve that supplies a second operating hydraulic pressure to a hydraulic servo of a second friction engagement element; a third solenoid valve that supplies a third operating hydraulic pressure to a hydraulic servo of a third friction engagement element and is a normally open solenoid valve that outputs the third operating hydraulic pressure during non-energizing; a preliminary shift speed switching valve that switches to a low speed side position in order to output a first preliminary hydraulic pressure for the hydraulic servo of the first friction engagement element and a high speed side position in order to output a second preliminary hydraulic pressure for the hydraulic servo of the second friction engagement element based on an engaged state of the second friction engagement element; and a hydraulic pressure supply switching valve that switches to a normal position that supplies the first and second operating hydraulic pressures to the hydraulic servos of the first and second friction engagement elements, respectively, and a failure position that supplies the first and second preliminary hydraulic pressures to the hydraulic servos of the first and second friction engagement elements, respectively, at a failure resulting in non-energizing. The second friction engagement element is engaged at high speed side shift speeds, a low speed that is one of low speed side shift speeds is achieved by engagement of the first friction engagement element and the third friction engagement element, and a high speed that is one of the high speed side shift speeds is achieved by engagement of the second friction engagement element and the third friction engagement element.

BRIEF DESCRIPTION OF THE DRAWINGS

Various exemplary aspects of the invention will be described with reference to the drawings, wherein:

FIG. 2 is an engagement table of the automatic transmission;

DETAILED DESCRIPTION OF THE PREFERRED EMBODIMENTS

First Embodiment

The following describes a first embodiment according to the present invention with reference to FIG. 1 through FIG. 4.

Outline Structure of Automatic Transmission

Figure 1:
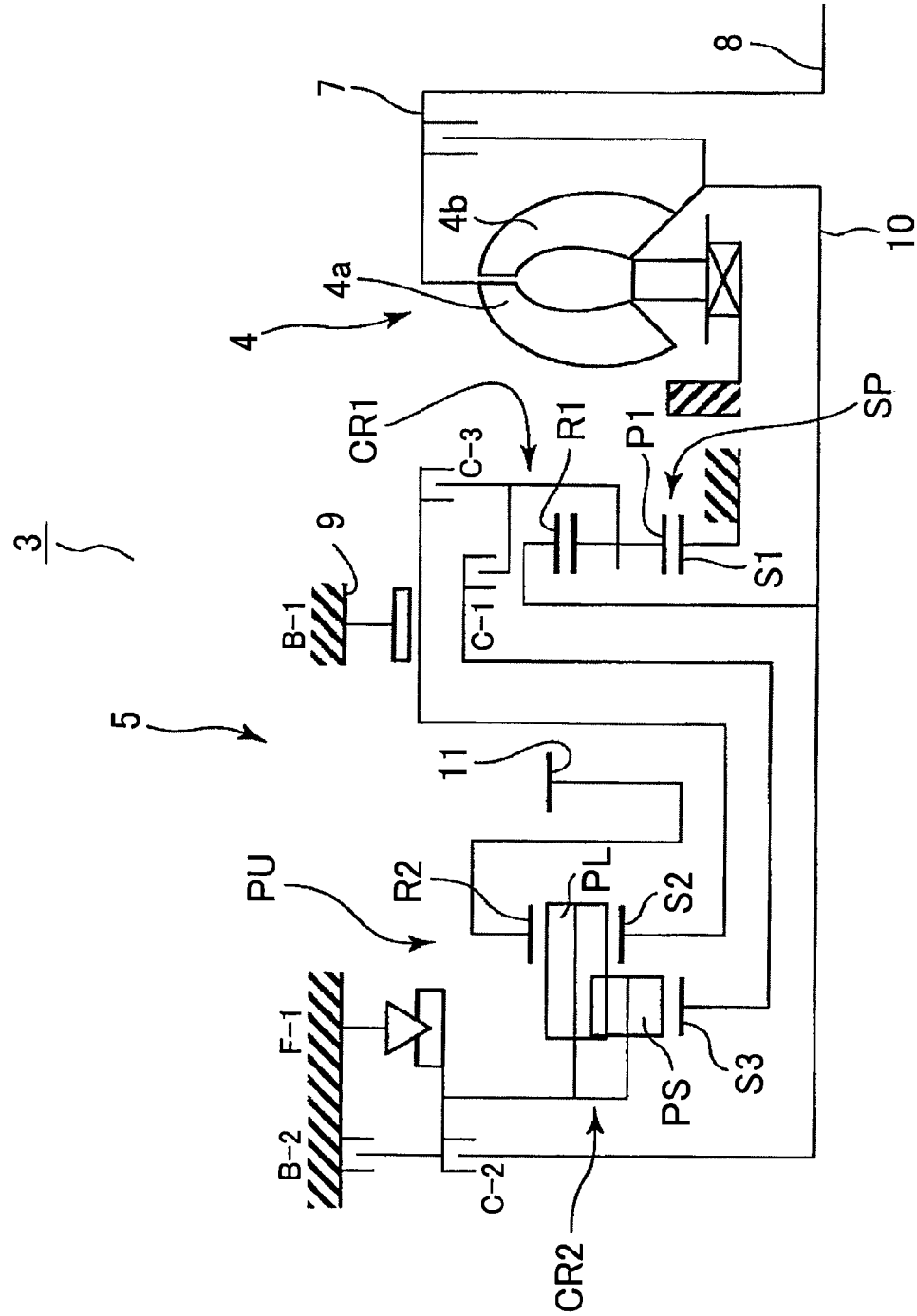
FIG. 1 is a skeleton diagram showing an automatic transmission according to the present invention.

First, the outline structure of an automatic transmission 3 to which the present invention can be applied will be described with reference to FIG. 1. As shown in FIG. 1, the automatic transmission 3 suitable for a vehicle of FF type (front engine, front drive) has an input shaft 8 of the automatic transmission that can be connected to an engine (not shown) and is equipped with a torque converter 4 and an automatic speed change mechanism 5 centering on the axial direction of the input shaft 8.

The torque converter 4 has a pump impeller 4a connected to the input shaft 8 of the automatic transmission 3, and a turbine runner 4b to which the rotation of the pump impeller 4a is transmitted via a working fluid. The turbine runner 4b is connected to an input shaft 10 of the automatic speed change mechanism 5 disposed coaxial with the input shaft 8. The torque converter 4 includes a lockup clutch 7, and when the lockup clutch 7 is engaged, the rotation of the input shaft 8 of the automatic transmission 3 is transmitted directly to the input shaft 10 of the automatic speed change mechanism 5.

The automatic speed change mechanism 5 includes a planetary gear SP and a planetary gear unit PU on the input shaft 10. The planetary gear SP includes a sun gear S1, a carrier CR1 and a ring gear R1, and on the carrier CR1, the planetary gear SP has a pinion P1 to mesh with the sun gear S1 and the ring gear R1, and it is a so-called single pinion planetary gear.

The planetary gear unit PU has a sun gear S2, a sun gear S3, a carrier CR2, and a ring gear R2 as four rotating elements, and on the carrier CR2, the planetary gear unit PU has a long pinion PL to mesh with the sun gear S2 and the ring gear R2, and a short pinion PS to mesh with the sun gear S3 in the intermeshing form, and it is a so-called Ravigneaux type planetary gear.

The sun gear S1 of the planetary gear SP is connected and held stationary to a boss portion (not shown) integrally fixed to a transmission case 9. The ring gear R1 has the same rotation (hereinafter called "input rotation") as that of the input shaft 10. The carrier CR1 has decelerated rotation in which input rotation is decelerated by the fixed sun gear S1 and the ring gear R1 of the input rotation and connected to a clutch C-1 (first friction engagement element) and a clutch C-3 (third friction engagement element).

The sun gear S2 of the planetary gear unit PU is connected to a brake B-1, which is a band brake, and can be fixed to the transmission case 9, and is connected to the clutch C-3, and the decelerated rotation of the carrier CR1 can be input via the clutch C-3. The sun gear S3 is connected to the clutch C-1, and the decelerated rotation of the carrier CR1 can be input.

The carrier CR2 is connected to a clutch C-2 (second friction engagement element) to which the rotation of the input shaft 10 is input, and the input rotation can be input via the clutch C-2. Further, the carrier CR2 is connected to a one-way clutch F-1 and a brake B-2, and the rotation in one direction is restricted with respect to the transmission case 9 via the one-way clutch F-1, and the rotation can be fixed via the brake B-2. The ring gear R2 is connected to a counter gear 11, and the counter gear 11 is connected to driving wheels via a counter shaft and a differential device (which are not shown).

Operation of Each Shift Speed in Automatic Transmission

Figure 3:
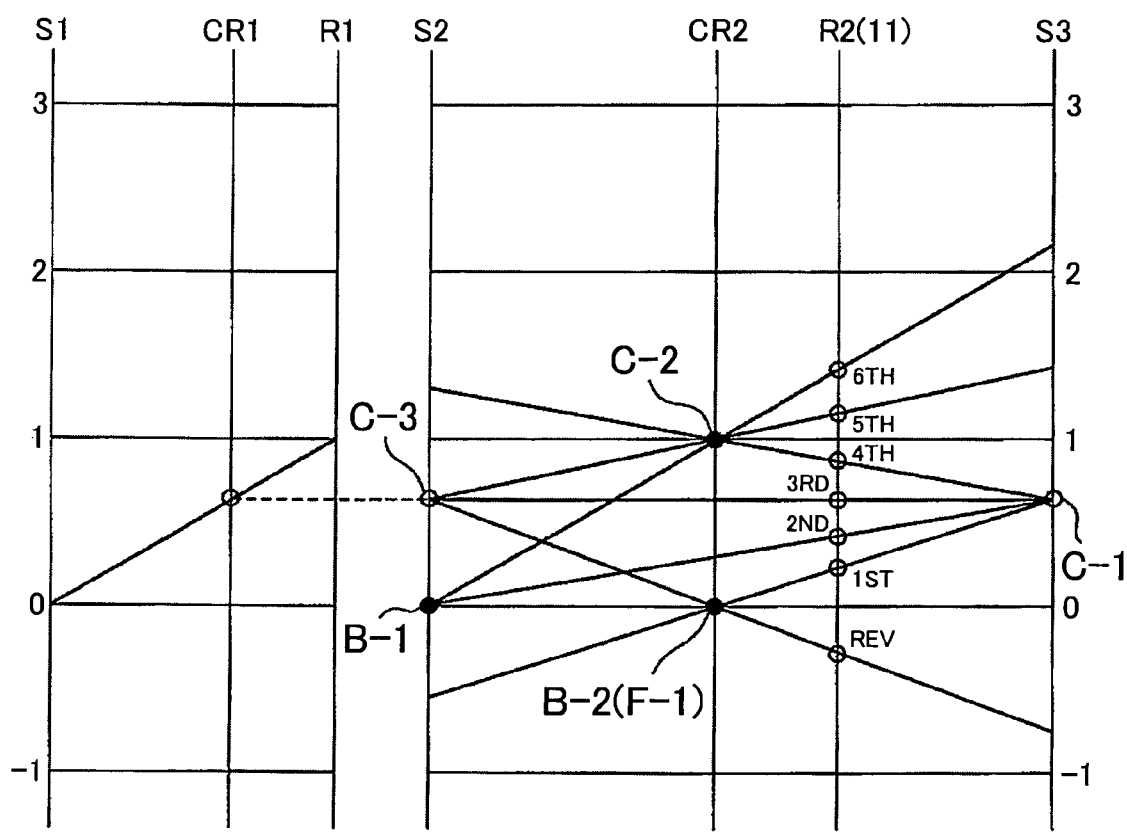
FIG. 3 is a velocity diagram of the automatic transmission.

Based on the above structure, the operation of the automatic speed change mechanism 5 will now be described with reference to FIGS. 1, 2, and 3. In a velocity diagram shown in FIG. 3, the vertical axis direction indicates the rotational speeds of the respective rotating elements (respective gears) and the horizontal axis direction corresponds to the gear ratio of the rotating elements. In the portion of the planetary gear SP in the velocity diagram, the vertical axes correspond to the sun gear S1, the carrier CR1 and the ring gear R1 sequentially from the left side in FIG. 3. In the portion of the planetary gear unit PU of the velocity diagram, the vertical axes correspond to the sun gear S3, the ring gear R2, the carrier CR2 and the sun gear S2 sequentially from the right side in FIG. 3.

In the D (drive) range, for example, at a forward first speed (1ST), the clutch C-1 and the one-way clutch F-1 are engaged as shown in FIG. 2. Then, as shown in FIG. 1 and FIG. 3, the rotation of the carrier CR1 is input to the sun gear S3 via the clutch C-1, the rotation of the carrier CR1 being decelerated by the fixed sun gear S1 and the ring gear R1 of input rotation. The rotation of the carrier CR2 is restricted to one direction (normal rotation direction), i.e., the reverse rotation of the carrier CR2 is prevented resulting in a fixed state. Then, the decelerated rotation input to the sun gear S3 is output to the ring gear R2 via the fixed carrier CR2, and the normal rotation as the forward first speed is output from the counter gear 11.

When the engine brake is applied (coasting), the brake B-2 is locked and the carrier CR2 is fixed, and in the form of preventing the normal rotation of the carrier CR2, the state of the forward first speed is maintained. At the forward first speed, the reverse rotation of the carrier CR2 is prevented by the one-way clutch F-1 and the normal rotation is made possible. Therefore, when the non-running range is changed to the running range, for example, the forward first speed can be smoothly achieved through automatic engaging of the one-way clutch F-1.

At a forward second speed (2ND), the clutch C-1 is engaged and the brake B-1 is locked as shown in FIG. 2. Then, as shown in FIG. 1 and FIG. 3, the rotation of the carrier CR1 decelerated by the fixed sun gear S1 and the ring gear R1 of input rotation is input to the sun gear S3 via the clutch C-1. When the brake B-1 is locked, the rotation of the sun gear S2 is fixed. Then, the rotation of the carrier CR2 is decelerated to be lower than that of the sun gear S3, and the decelerated rotation input to the sun gear S3 is output to the ring gear R2 via the carrier CR2, and the normal rotation as the forward second speed is output from the counter gear 11.

At a forward third speed (3RD), the clutch C-1 and clutch C-3 are engaged as shown in FIG. 2. Then, as shown in FIG. 1 and FIG. 3, the rotation of the carrier CR1 decelerated by the fixed sun gear S1 and the ring gear R1 of input rotation is input to the sun gear S3 via the clutch C-1. When the clutch C-3 is engaged, the decelerated rotation of the carrier CR1 is input to the sun gear S2. That is, since the decelerated rotation of the carrier CR1 is input to the sun gear S2 and sun gear S3, the planetary gear unit PU is brought into a directly connected state of the decelerated rotation, and the decelerated rotation is output without change to the ring gear R2, and the normal rotation as the forward third speed is output from the counter gear 11.

At a forward fourth speed (4TH), the clutch C-1 and the clutch C-2 are engaged as shown in FIG. 2. Then, as shown in FIG. 1 and FIG. 3, the rotation of the carrier CR1 decelerated by the fixed sun gear S1 and the ring gear R1 of input rotation is input to the sun gear S3 via the clutch C-1. Further, the input rotation is input to the carrier CR2 due to the engagement of the clutch C-2. Then, due to the decelerated rotation input to the sun gear S3 and the input rotation input to the carrier CR2, a decelerated rotation higher than the forward third speed occurs and is output to the ring gear R2, and the normal rotation as the forward fourth speed is output from the counter gear 11.

At a forward fifth speed (5TH), the clutch C-2 and clutch C-3 are engaged as shown in FIG. 2. Then, as shown in FIG. 1 and FIG. 3, the rotation of the carrier CR1 decelerated by the fixed sun gear S1 and the ring gear R1 of input rotation is input to the sun gear S2 via the clutch C-3. Further, the input rotation is input to the carrier CR2 due to the engagement of the clutch C-2. Then, due to the decelerated rotation input to the sun gear S2 and the input rotation input to the carrier CR2, an accelerated rotation slightly higher than the input rotation occurs and is output to the ring gear R2, and the normal rotation as the forward fifth speed is output from the counter gear 11.

At a forward sixth speed (6TH), the clutch C-2 is engaged and the brake B-1 is locked as shown in FIG. 2. Then, as shown in FIG. 1 and FIG. 3, the input rotation is input to the carrier CR2 due to the engagement of the clutch C-2. Further, the rotation of the sun gear S2 is fixed by the lock of the brake B-1. Due to the fixed sun gear S2, the input rotation of the carrier CR2 becomes an accelerated rotation higher than the forward fifth speed and is output to the ring gear R2, and the normal rotation as the forward sixth speed is output from the counter gear 11.

At a reverse first speed (REV), the clutch C-3 is engaged and the brake B-2 is locked as shown in FIG. 2. Then, as shown in FIG. 1 and FIG. 3, the rotation of the carrier CR1 decelerated by the fixed sun gear S1 and the ring gear R1 of input rotation is input to the sun gear S2 via the clutch C-3. Further, the rotation of the carrier CR2 is fixed by the lock of the brake B-2. Then, the decelerated rotation input to the sun gear S2 is output to the ring gear R2 via the fixed carrier CR2, and the reverse rotation as the reverse first speed is output from the counter gear 11.

In P (parking) range and N (neutral) range, for example, the clutch C-1, the clutch C-2, and the clutch C-3 are released. Then, disconnected state occurs between the carrier CR1 and the sun gear S2 and the sun gear S3, i.e., between the planetary gear SP and the planetary gear unit PU, and also the disconnected state occurs between the input shaft 10 and the carrier CR2. This disconnects power transmission between the input shaft 10 and the planetary gear unit PU, i.e., the power transmission between the input shaft 10 and the counter gear 11 is disconnected.

Outline Structure of Hydraulic Control Device

A hydraulic control device $1_1$ for the automatic transmission according to the present invention will now be described. First, the generating portions of line pressure, secondary pressure, modulator pressure and range pressure, whose illustration is omitted, in the hydraulic control device $1_1$ are outlined. Since these generating portions of line pressure, secondary pressure, modulator pressure and range pressure are similar to those in an ordinary hydraulic control device for an automatic transmission and well known, they are briefly described.

This hydraulic control device $1_1$ includes an oil pump, a manual shift valve, a primary regulator valve, a secondary regulator valve, a solenoid modulator valve, and a linear solenoid valve whose illustration is omitted. When the engine is started, the oil pump that is rotatably and drivingly connected to the pump impeller 4a of the torque converter 4 is driven in accordance with the rotation of the engine, thereby generating a hydraulic pressure in the form of sucking up the oil via a strainer from an oil pan not illustrated.

The hydraulic pressure generated by the oil pump is regulated to a line pressure $P_L$ while the discharge thereof is regulated by the primary regulator valve, based on a signal pressure $P_{SLT}$ of the linear solenoid valve that is regulated and output in accordance with the throttle opening. This line pressure $P_L$ is supplied to the manual shift valve (range switching valve), the solenoid modulator valve, and a linear solenoid valve SLC3 described later in detail. The line pressure $P_L$ supplied to the solenoid modulator valve is regulated to a modulator pressure $P_{MOD}$ that is made approximately constant by the valve. This modulator pressure $P_{MOD}$ is supplied as an original pressure to the linear solenoid valve and solenoid valves S11 and S12 described later in detail.

The pressure discharged from the primary regulator valve is regulated to a secondary pressure $P_{SEC}$ while the discharge thereof is further regulated by the secondary regulator valve, for example. The secondary pressure $P_{SEC}$ is supplied to a lubricating oil passage and an oil cooler, for example, and also to the torque converter 4 and is also used for controlling the lockup clutch 7.

The manual shift valve (not illustrated) has a spool to be mechanically (or electrically) driven to a shift lever provided at the driver's seat (not illustrated), and the position of the spool is changed in accordance with the shift range (e.g. P, R, N, and D) selected by the shift lever, thereby setting the output state or non-output state (drain) of the input line pressure $P_L$.

In detail, if the D range is set through the operation of the shift lever, an input port to which the line pressure $P_L$ is input and a forward range pressure output port are connected based on the position of the spool, and from the forward range pressure output port, the line pressure $P_L$ is output as a forward range pressure (D range pressure) $P_D$. If the R (reverse) range is set through the operation of the shift lever, the input port and a reverse range pressure output port are connected based on the position of the spool, and from the reverse range pressure output port, the line pressure $P_L$ is output as a reverse range pressure (R range pressure) $P_{REV}$. If the P range or the N range is set through the operation of the shift lever, cutoff is made between the input port and the forward range pressure output port or the reverse range pressure output port by the spool, and the forward range pressure output port or the reverse range pressure output port is connected to a drain port. That is, the D range pressure $P_D$ or the R range pressure $P_{REV}$ is drained, resulting in the non-output state.

Detailed Structure of Shift Control Portion of Hydraulic Control Device

The portion mainly performing shift control in the hydraulic control device $1_1$ according to the present invention will now be described with reference to FIG. 4. In the present embodiment, the right half position and the left half position shown in FIG. 4 are called a "right half position" and a "left half position", respectively, to describe the spool position.

This hydraulic control device $1_1$ includes four linear solenoid valves SLC1, SLC2, SLC3, and SLB1 to directly supply the output pressure regulated as an engaging pressure to five hydraulic servos in total: a hydraulic servo 41 of the clutch C-1, a hydraulic servo 42 of the clutch C-2, a hydraulic servo 43 of the clutch C-3, a hydraulic servo 44 of the brake B-1, and a hydraulic servo 45 of the brake B-2. The hydraulic control device $1_1$ also includes the solenoid valve S11, the solenoid valve S12, a first clutch apply relay valve 21, a second clutch apply relay valve 22, a C-2 relay valve 23, and a B-2 relay valve 24, for example, as portions to achieve the limp-home function, and to switch the output pressure of the linear solenoid valve SLC2 to the hydraulic servo 42 of the clutch C-2 or the hydraulic servo 45 of the brake B-2.

Figure 4:
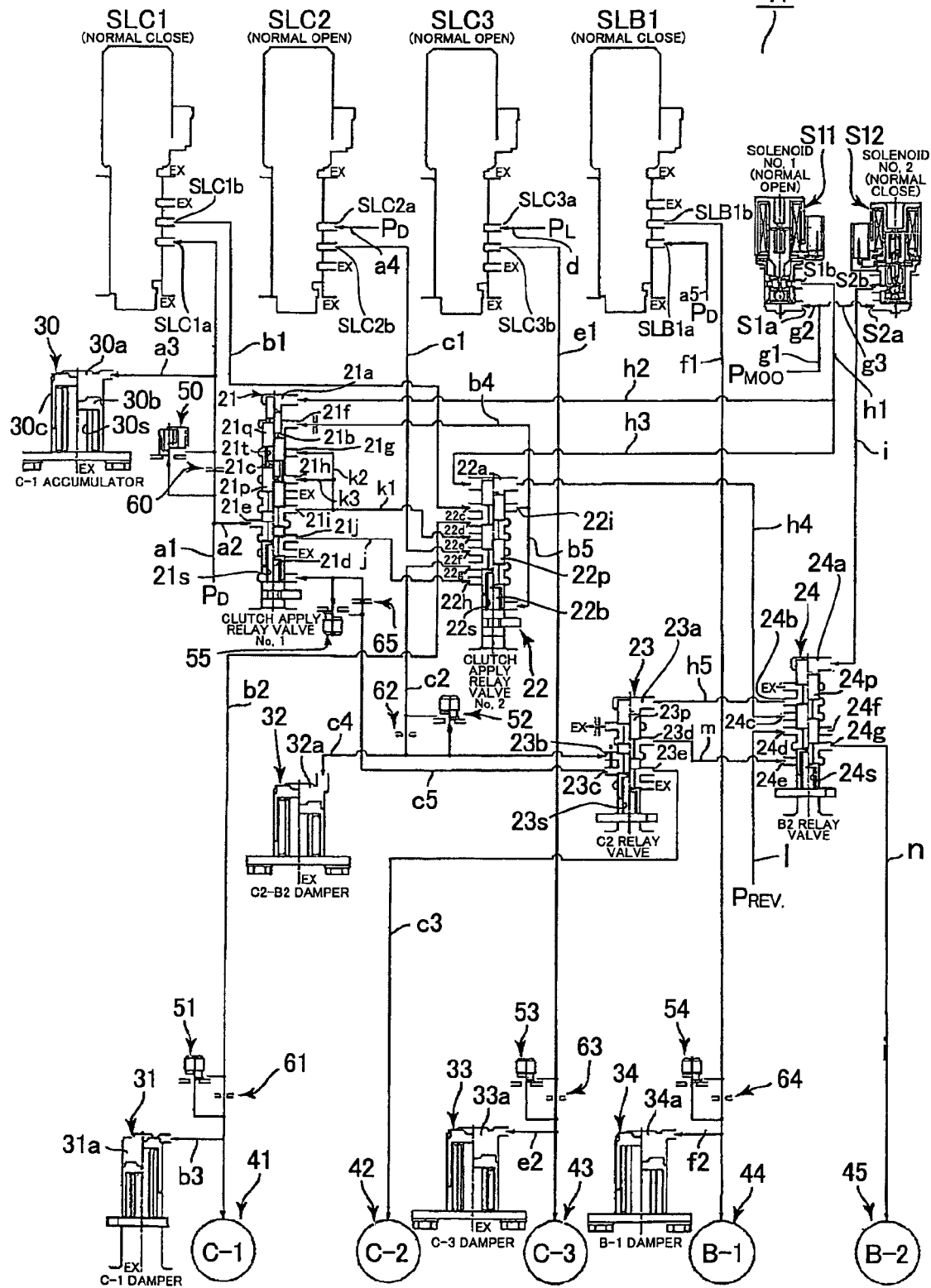
FIG. 4 is a circuit diagram showing a hydraulic control device for an automatic transmission according to a first embodiment.

To an oil passage a1, an oil passage a4, and an oil passage a5 shown in FIG. 4, the forward range pressure output port (not illustrated) of the manual shift valve is connected so that the forward range pressure $P_D$ can be input. To an oil passage 1, the reverse range pressure output port (not illustrated) of the manual shift valve is connected so that the reverse range pressure $P_{REV}$ can be input. To an oil passage d, the line pressure $P_L$ from the primary regulator valve (not illustrated) is input. Further, to an oil passage g1, the modulator pressure $P_{MOD}$ from the modulator valve (not illustrated) is input.

Among the oil passages, the oil passage a1 is connected via an oil passage a2 to an input port 21e of the first clutch apply relay valve 21 to be detailed later, and is provided with a check valve 50 and an orifice 60. The oil passage a1 is connected to an accumulator 30 via an oil passage a3 and is also connected to the linear solenoid valve SLC1. The accumulator 30 has a case 30c, a piston 30b disposed inside the case 30c, a spring 30s to energize the piston 30b, and an oil chamber 30a formed between the case 30c and the piston 30b.

The linear solenoid valve (first solenoid valve) SLC1 is of a normal close type that is placed in the non-output state during non-energizing, and has an input port SLC1a to input the forward range pressure $P_D$ via the oil passage a1 and an output port SLC1b to adjust the forward range pressure $P_D$ and output a controlled pressure (first operating hydraulic pressure) $P_{SLC1}$ as an engaging pressure $P_{C1}$ to the hydraulic servo 41. That is, the linear solenoid valve SLC1 is so structured that it cuts off the input port SLC1a and the output port SLC1b to get into the non-output state during non-energizing, and during energizing based on a command value from a control unit (ECU) not illustrated, it increases the amount (amount of opening) to communicate the input port SLC1a with the output port SLC1b in accordance with the command value so that it can output the engaging pressure $P_{C1}$ in accordance with the command value. The output port SLC1b of the linear solenoid valve SLC1 is connected to an input port 22c of the second clutch apply relay valve 22 described later via an oil passage b1.

On the other hand, the linear solenoid valve (second solenoid valve) SLC2 is of a normal open type that gets into the output state during non-energizing, and has an input port SLC2a to input the forward range pressure $P_D$ via the oil passage a4, etc. and an output port SLC2b to adjust the forward range pressure $P_D$ and output a controlled pressure (second operating hydraulic pressure) $P_{SLC2}$ as an engaging pressure $P_{C2}$ (or engaging pressure $P_{B2}$) to the hydraulic servo 42. In other words, the linear solenoid valve SLC2 gets into an output state with the input port SLC2a and the output port SLC2b communicated during non-energizing, and during energizing based on a command value from the control unit (ECU) not illustrated, the linear solenoid valve SLC2 decreases the amount (or reduce the amount of opening) to communicate the input port SLC2a with the output port SLC2b in accordance with the command value, that is, it is so structured that it can output the engaging pressure $P_{C2}$ (or $P_{B2}$) in accordance with the command value. The linear solenoid valve SLC2 is connected to an input port 22f of the second clutch apply relay valve 22 described later via an oil passage c1.

The linear solenoid valve (third solenoid valve) SLC3 is of a normal open type that gets into the output state during non-energizing, and has an input port SLC3a to input the line pressure $P_L$ via the oil passage d, etc., and an output port SLC3b to adjust the line pressure $P_L$ and output a controlled pressure (third operating hydraulic pressure) $P_{SLC3}$ as an engaging pressure $P_{C3}$ to the hydraulic servo 43. That is, the linear solenoid valve SLC3 gets into an output state with the input port SLC3a and the output port SLC3b communicated during non-energizing, and during energizing based on a command value from the control unit (ECU) not illustrated, the linear solenoid valve SLC3 decreases the amount (reduce the amount of opening) to communicate the input port SLC3a with the output port SLC3b in accordance with the command value so that it can output the engaging pressure $P_{C3}$ in accordance with the command value. The output port SLC3b of the linear solenoid valve SLC3 is connected to the hydraulic servo 43 of the clutch C-3 via an oil passage e1. The oil passage e1 is provided with a check valve 53 and an orifice 63, and via an oil passage e2, an oil chamber 33a of a C-3 damper 33 is connected thereto. Since the C-3 damper 33 has the same structure as that of the accumulator 30 and is an ordinary damper, its detailed explanation is omitted.

The linear solenoid valve SLB1 is of a normal close type that gets into the non-output state during non-energizing, and has an input port SLB1a to input the forward range pressure $P_D$ via the oil passage a5, etc. and an output port SLB1b to adjust the forward range pressure $P_D$ and output a controlled pressure $P_{SLB1}$ as an engaging pressure $P_{B1}$ to the hydraulic servo 44. That is, the linear solenoid valve SLB1 cuts off the input port SLB1a and the output port SLB1b to get into the non-output state during non-energizing, and during energizing based on a command value from the control unit (ECU) not illustrated, it increases the amount (amount of opening) to communicate the input port SLB1a with the output port SLB1b in accordance with the command value so that it can output the engaging pressure $P_{B1}$ in accordance with the command value. The output port SLB1b of the linear solenoid valve SLB1 is connected to the hydraulic servo 44 of the brake B-1 via an oil passage f1. The oil passage f1 is provided with a check valve 54 and an orifice 64, and via an oil passage f2, an oil chamber 34a of a B-1 damper 34 is connected thereto.

The solenoid valve (fourth solenoid valve) S11 is of a normal open type that gets into the output state during non-energizing, and has an input port S1a to input the modulator pressure $P_{MOD}$ via the oil passages g1 and an oil passage g2, and an output port S1b to output the modulator pressure $P_{MOD}$ approximately as it is as a signal pressure $P_{S1}$ during non-energizing (i.e., during OFF). The output port S1b is connected to an oil chamber 21a of the first clutch apply relay valve 21 via an oil passages h1, h2. Further, via oil passages h1, h3, the output port S1b is connected to an oil chamber 22a of the second clutch apply relay valve 22, and via an oil passage h4, it is connected to an input port 24c of the B-2 relay valve 24.

The solenoid valve S12 is of a normal close type that gets into the non-output state during non-energizing, and has an input port S2a to input the modulator pressure $P_{MOD}$ via the oil passages g1 and an oil passage g3, and an output port S2b to output the modulator pressure $P_{MOD}$ approximately as it is as a signal pressure $P_{S2}$ during energizing (i.e., during ON). The output port S2b is connected to an oil chamber 24a of the B-2 relay valve 24 via an oil passage i.

The first clutch apply relay valve (preliminary shift speed switching valve) 21 has two spools 21p and 21q (first spool), a spring 21s (first biasing device) to bias the spool 21p upward in the figure, and a spring 21t to bias the spools 21p and 21q in a direction to separate them, and also has the oil chamber 21a at the upper part in the figure of the spool 21q, an oil chamber 21d at the lower part in the figure of the spool 21p, an oil chamber 21c between the spools 21p and 21q, and an oil chamber 21b (first oil chamber) formed due to a diameter difference (difference in pressure receiving area) of the land portion of the spool 21q, and furthermore, it has the input port 21e, an input port 21f, an input port 21g, an input port 21h, an output port 21i, an output port 21j, and a drain port EX.

The first clutch apply relay valve 21 is so structured that when the spools 21p, 21q are set to the left half position (high speed side position), the input port 21e and the output port 21j are communicated and the input port 21e and the output port 21i are disconnected, and when they are set to the right half position (low speed side position), the input port 21e and the output port 21i are communicated and the output port 21j and the drain port EX are communicated. When the spool 21p is set to the left half position, the input port 21h is disconnected, and when the spool 21q is set to the right half position, the input port 21g is disconnected.

As described above, the oil chamber 21a is connected to the output port S1b of the solenoid valve S11 via the oil passages h1, h2, and the oil chamber 21b is connected to an output port 22i of the second clutch apply relay valve 22 described later via an oil passage b4 from the input port 21f. To the input port 21e, the forward range pressure $P_D$ is input via the oil passages a1, a2. The output port 21j that is communicated with the input port 21e when the spool 21p is at the left half position is connected to an input port 22h of the second clutch apply relay valve 22 via an oil passage j. The output port 21i that is communicated with the input port 21e when the spool 21p is at the right half position is connected to the input port 21g via oil passages k1, k2 and to the input port 21h via oil passages k1, k2, k3. That is, the output port 21i is connected to the oil chamber 21c regardless of the position of the spools 21p, 21q. The output port 21i is connected to an input port 22e of the second clutch apply relay valve 22 described later via the oil passage k1. To the oil chamber 21d, an output port 23c of the C-2 relay valve 23 is connected via an oil passage c5, and the oil passage c5 is provided with a check valve 55 and an orifice 65.

The second clutch apply relay valve (hydraulic pressure supply switching valve) 22 has a spool 22p (second spool) and a spring 22s (second biasing device) to bias the spool 22p upward in the figure and also has the oil chamber 22a (second oil chamber) at the upper part in the figure of the spool 22p and an oil chamber 22b at the lower part in the figure of the spool 22p. Further, the second clutch apply relay valve 22 has the input port 22c, an output port 22d, the input port 22e, the input port 22f, an output port 22g, the input port 22h, and the output port 22i.

The second clutch apply relay valve 22 is so structured that when the spool 22p is set to the left half position (normal position), the input port 22c and the output port 22d and the output port 22i are communicated and the input port 22f and the output port 22g are communicated, and the input port 22e and the input port 22h are disconnected; and when the spool 22p is set to the right half position (failure position), the input port 22e and the output port 22d are communicated and the input port 22h and the output port 22g are communicated, and the input port 22c and the output port 22i and the input port 22f are disconnected.

As described above, the oil chamber 22a is connected to the output port S1b of the solenoid valve S11 via the oil passages h1, h3, and connected to the input port 24c of the B-2 relay valve 24 described later via the oil passage h4. The input port 22c is connected to the output port SLC1b of the linear solenoid valve SLC1 via the oil passage b1. The output port 22d that is communicated with the input port 22c when the spool 22p is set to the left half position is connected to the hydraulic servo 41 of the clutch C-1 via an oil passage b2. The oil passage b2 is provided with a check valve 51 and an orifice 61, and via an oil passage b3, an oil chamber 31a of a C-1 damper 31 is connected thereto. The output port 22i that is communicated with the input port 22c when the spool 22p is set to the left half position is connected to the input port 21f of the first clutch apply relay valve 21 via the oil passage b4, and is connected to the oil chamber 22b via oil passages b4, b5. On the other hand, the input port 22f is connected to the output port SLC2b of the linear solenoid valve SLC2 via the oil passage c1, and the input port 22h is connected to the output port 21j of the first clutch apply relay valve 21 via the oil passage (second oil passage) j. The output port 22g that is communicated with the input port 22f when the spool 22p is set to the left half position and communicated with the input port 22h when the spool 22p is set to the right half position is connected to an input port 23b of the C-2 relay valve 23 described later via an oil passage c2. The oil passage c2 is provided with a check valve 52 and an orifice 62 and via an oil passage c4, an oil chamber 32a of a C2-B2 damper 32 is connected thereto.

The C-2 relay valve 23 has a spool 23p and a spring 23s to bias the spool 23p upward in the figure, and also has an oil chamber 23a at the upper part in the figure of the spool 23p, and furthermore, it has the input port 23b, the output port 23c, an output port 23d, an output port 23e and a drain port EX.

The C-2 relay valve 23 is so structured that, when the spool 23p is set to the left half position, the input port 23b and the output port 23c and the output port 23e are communicated and the output port 23d and the drain port EX are communicated, and when the spool 23p is set to the right half position, the input port 23b and the output port 23d are communicated and the output port 23c and the output port 23e and the drain port EX are communicated.

The oil chamber 23a is connected to an output port 24b of the B-2 relay valve 24 described later via an oil passage h5. The input port 23b is connected to the output port 22g of the second clutch apply relay valve 22 via the oil passage c2. The output port 23e that is communicated with the input port 23b when the spool 23p is at the left half position is connected to the hydraulic servo 42 of the clutch C-2 via an oil passage c3. The output port 23c that is communicated with the input port 23b when the spool 23p is at the left half position is connected to the oil chamber 21d of the first clutch apply relay valve 21 via the oil passage c5. The oil passage c5 is provided with the check valve 55 and the orifice 65. The output port 23d that is communicated with the input port 23b when the spool 23p is at the right half position is connected to an input port 24e of the B-2 relay valve 24 via an oil passage m.

The B-2 relay valve 24 has a spool 24p, and a spring 24s to bias the spool 24p upward in the figure, and also has the oil chamber 24a at the upper part in the figure of the spool 24p. Further, the B-2 relay valve 24 has the output port 24b, the input port 24c, an input port 24d, the input port 24e, an output port 24f, an output port 24g, and a drain port EX.

The B-2 relay valve 24 is so structured that, when the spool 24p is set to the left half position, the input port 24d and the output port 24f and the output port 24g are communicated and the output port 24b and the drain port EX are communicated, and the input port 24c is disconnected; and when the spool 24p is set to the right half position, the input port 24c and the output port 24b are communicated and the input port 24e and the output port 24g are communicated, and the input port 24d and the drain port EX are disconnected.

The oil chamber 24a is connected to the output port S2b of the solenoid valve S12 via an oil passage i. The input port 24d is connected to the reverse range pressure output port (not illustrated) of the manual shift valve to which the reverse range pressure $P_{REV}$ is output via an oil passage i. The input port 24e is connected to the output port 23d of the C-2 relay valve 23 via the oil passage m. The output port 24g that is communicated with the input port 24d when the spool 24p is at the left half position and that is communicated with the input port 24e when the spool 24p is at the right half position is connected to the hydraulic servo 45 of the brake B-2 via an oil passage n. That is, the hydraulic servo 45 of the brake B-2 is connected to the reverse range pressure output port (not illustrated) of the manual shift valve, or to the output port SLC2b of the linear solenoid valve SLC2. As described above, the input port 24c is connected to the output port S1b of the solenoid valve S11 via the oil passage h4, the oil chamber 22a of the second clutch apply relay valve 22, and the oil passages h1, h3. The output port 24b is communicated with the input port 24c when the spool 24p is at the right half position is connected to the oil chamber 23a of the C-2 relay valve 23 via the oil passage h5. The output port 24f that is communicated with the input port 24d when the spool 24p is at the left half position is connected to the oil chamber of the primary regulator valve via an oil passage (not illustrated), and the line pressure $P_L$ is raised during reverse travel by having the reverse range pressure $P_{REV}$ work on the primary regulator valve.

Operation of Hydraulic Control Device

Then, description is made of the action of the hydraulic control device $1_1$ according to the present embodiment.

If, for example, the ignition is switched ON by the driver, the hydraulic control for this hydraulic control device $1_1$ is started. If the selected position of the shift lever is P range or N range, the normal type linear solenoid valve SLC2, the linear solenoid valve SLC3 and the solenoid valve S11 are energized by electric command of the control unit not illustrated and the respective input ports and output ports are disconnected. Then, if the engine is started, a hydraulic pressure is generated by the rotation of the oil pump (not illustrated) based on the engine rotation, and the hydraulic pressure is regulated to a line pressure $P_L$ and a modulator pressure $P_{MOD}$, respectively, by the primary regulator valve and the solenoid modulator valve and output, and the line pressure $P_L$ is input to the input port of the manual shift valve not illustrated and to the input port SLC3a of the linear solenoid valve SLC3 via the oil passage d, and the modulator pressure $P_{MOD}$ is input to the input ports S1a, S2a of the solenoid valves S11, S12 via the oil passages g1, g2, g3.

Then, if the driver changes the shift lever from the N range position to the D range position, a forward range pressure $P_D$ is output to the oil passages a1, a4, a5 from the forward range pressure output port of the manual shift valve. The forward range pressure $P_D$ is input to the linear solenoid valve SLC1 via the oil passage a1, the linear solenoid valve SLC2 via the oil passage a4, the linear solenoid valve SLB1 via the oil passage a5, and the first clutch apply relay valve 21 via the oil passages a1, a2, respectively.

The oil passage a1 is provided with the check valve 50 and the orifice 60, and since the check valve 50 is opened by the forward range pressure $P_D$, the supply of the forward range pressure $P_D$ to the linear solenoid valve SLC1 becomes quicker than in discharge. The forward range pressure $P_D$ supplied to the oil passage a1 is input to the oil chamber 30a of the accumulator 30 via the oil passage a3. The accumulator 30 accumulates the forward range pressure $P_D$ to be supplied to the linear solenoid valve SLC1.

The first clutch apply relay valve 21 where the forward range pressure $P_D$ is input from the oil passage a2 is shifted to the left half position by the biasing force of the spring 21s at the beginning of switching to D range (at the beginning of N-D shifting) because the signal pressure $P_{S1}$ is not output with the solenoid valve S11 set to ON, and the forward range pressure $P_D$ is output to the oil passage j from the output port 21j. However, since the signal pressure $P_{S1}$ is not output with the solenoid valve S11 set to ON, the input port 22h is disconnected in the second clutch apply relay valve 22, which is shifted to the left half position by the biasing force of the spring 22s.

Then, if the forward first speed is judged by the control unit, the linear solenoid valve SLC1 is switched ON by electrical control of the control unit, and the forward range pressure $P_D$ input to the input port SLC1a is regulated and controlled, and the controlled pressure $P_{SLC1}$ is gradually increased as the engaging pressure $P_{C1}$ and output from the output port SLC1b. The controlled pressure $P_{SLC1}$ (engaging pressure $P_{C1}$) is input to the input port 22c of the second clutch apply relay valve 22 via the oil passage b1.

The second clutch apply relay valve 22 set to the left half position outputs the controlled pressure $P_{SLC1}$ input to the input port 22c, from the output port 22i and also from the output port 22d. The controlled pressure $P_{SLC1}$ output from the output port 22i is input to the oil chamber 22b via the oil passages b4, b5, and locks the second clutch apply relay valve 22 to the left half position, and is input to the oil chamber 21b of the first clutch apply relay valve 21 via the oil passage b4, and pushes the spools 21p, 21q to the lower part in the figure against the biasing force of the spring 21s, and switches the first clutch apply relay valve 21 to the right half position.

The first clutch apply relay valve 21, with the spools 21p, 21q switched to the right half position, pushes the spool 21q to the lower part in the figure against the biasing force of the spring 21t by means of the controlled pressure $P_{SLC1}$ output from the output port 22i of the second clutch apply relay valve 22. However, since the forward range pressure $P_D$ input from the input port 21e is output as a first preliminary hydraulic pressure $P_{DC1}$ from the output port 21i and is input to the oil chamber 21c via the oil passages k1, k2, k3 and the input port 21h, the spool 21q is switched to the upper part in the figure by means of the hydraulic pressure working on the oil chamber 21c and the biasing force of the spring 21t. That is, the spool 21p and spool 21q are locked in a state where they are separated from each other. The first preliminary hydraulic pressure $P_{DC1}$ (forward range pressure $P_D$) input to the input port 22e of the second clutch apply relay valve 22 from the oil passage k1 is blocked in the input port 22e.

The controlled pressure $P_{SLC1}$ input to the input port 22c of the second clutch apply relay valve 22 from the linear solenoid valve SLC1, as described above, is output as the engaging pressure $P_{C1}$ to the hydraulic servo 41 via the oil passage b2 from the output port 22d, and the clutch C-1 is engaged. Thus, together with the engaging of the one-way clutch F-1, the forward first speed is achieved.

The oil passage b2 is provided with the check valve 51 and the orifice 61. When the engaging pressure $P_{C1}$ (controlled pressure $P_{SLC1}$) is supplied to the hydraulic servo 41, the check valve 51 is closed and the hydraulic pressure is slowly supplied only through the orifice 61. When the engaging pressure $P_{C1}$ is discharged from the hydraulic servo 41, the check valve 51 is opened so that the engaging pressure $P_{C1}$ is quickly discharged compared to when being supplied. Further, the engaging pressure $P_{C1}$ supplied to the oil passage b2 is input to the oil chamber 31a of the C-1 damper 31 via the oil passage b3. The C-1 damper 31 prevents pulsation of the engaging pressure $P_{C1}$ supplied to and discharged from the hydraulic servo 41, and absorbs a surge pressure (rapid fluctuating pressure).

Operation in Engine Brake of Forward First Speed

If the engine brake of the forward first speed is judged by the control unit, the solenoid valve S112 is switched ON and the solenoid valve S11 is switched OFF by an electric command from the control unit and the linear solenoid valve SLC2 is controlled in pressure. When the solenoid valve S12 is switched ON, the modulator pressure $P_{MOD}$ input to the input port S2a via oil passages g1, g3 is output as a signal pressure $P_{S2}$ from the output port S2b and input to the oil chamber 24a of the B-2 relay valve 24 via the oil passage i. The spool 24p is switched to the lower part in the figure against the biasing force of the spring 24s, and the B-2 relay valve 24 is set to the right half position.

When the solenoid valve S11 is switched OFF, the modulator pressure $P_{MOD}$ input to the input port S1a via oil passages g1, g2 is output as a signal pressure $P_{S1}$ from the output port S1b, and is input to the oil chamber 21a of the first clutch apply relay valve 21 via the oil passages h1, h2, the oil chamber 22a of the second clutch apply relay valve 22 via the oil passages h1, h3, and the input port 24c of the B-2 relay valve 24 via the oil passage h4, and also to the oil chamber 23a of the C-2 relay valve 23 via the oil passage h5 from the output port 24b of the B-2 relay valve 24 set to the right half position.

Consequently, the spool 23p is switched to the lower part in the figure against the biasing force of the spring 23s by means of the signal pressure $P_{s1}$ input to the oil chamber 23a, and the C-2 relay valve 23 is set to the right half position. It should be noted that while the spool 21q is switched to the lower part in the figure because of the signal pressure $P_{S1}$ input to the oil chamber 21a and the first clutch apply relay valve 21 is set to the right half position, the spool 21p remains in the right half position as in the forward first speed without being specifically affected. While the signal pressure $P_{S1}$ is input to the oil chamber 22a in the second clutch apply relay valve 22, the engaging pressure $P_{C1}$ (controlled pressure $P_{SLC1}$) of the oil chamber 22b and the biasing force of the spring 22s surpass. As a result, the spool 22p remains to be locked in the left half position.

Then, when the linear solenoid valve SLC2 is controlled in pressure, and the controlled pressure $P_{SLC2}$ is output from the output port SLC2b, the controlled pressure $P_{SLC2}$ is input to the input port 22f of the second clutch apply relay valve 22 locked to the left half position via the oil passage c1, and is output as the engaging pressure $P_{B2}$ to the oil passage c2 from the output port 22g.

The engaging pressure $P_{B2}$ output to the oil passage c2 is input to the input port 23b of the C-2 relay valve 23 set to the right half position, and is output from the output port 23d. Furthermore, the engaging pressure $P_{B2}$ is input to the input port 24e of the B-2 relay valve 24 set to the right half position via the oil passage m, and is output from the output port 24g, and is input to the hydraulic servo 45 via the oil passage n, and the brake B-2 is locked. Thus, together with the engaging of the clutch C-1, the engine brake of the forward first speed is achieved.

The oil passage c2 is provided with the check valve 52 and the orifice 62, and when the engaging pressure $P_{B2}$ is supplied to the hydraulic servo 45 of the brake B-2, the check valve 52 is closed and the hydraulic pressure is slowly supplied through the orifice 62 only, and at the time of discharging to be described later, the check valve 52 is opened and the hydraulic pressure in the oil passage c2 is quickly discharged. The engaging pressure $P_{B2}$ supplied to the oil passage c2 is input to the oil chamber 32a of the C2-B2 damper 32 via the oil passage c4, and the C2-B2 damper 32 prevents pulsating of the engaging pressure $P_{B2}$ supplied to and discharged from the hydraulic servo 45, absorbs a surge pressure (rapid fluctuating pressure), etc.

If positive drive of the forward first speed is judged by the control unit or releasing of the engine brake state is judged, the solenoid valve S12 is set to OFF and the solenoid valve S11 to ON. Further, the linear solenoid valve SLC2 is closed in the form of ON (energizing), and the controlled pressure $P_{SLC2}$ as the engaging pressure $P_{B2}$ is set to 0 and drained. The engaging pressure $P_{B2}$ of the hydraulic servo 45 of the brake B-2 is discharged through the drain port of the manual shift valve via the input port 24d, an oil passage l, and the reverse range pressure output port (not illustrated) of the manual shift valve, because the B-2 relay valve 24 is switched to the left half position when the solenoid valve S12 is set to OFF. This makes quicker draining than the draining via the linear solenoid valve SLC2, and the brake B-2 is quickly released. Note that the hydraulic pressure in the oil passage m is discharged from the drain port EX of the C-2 relay valve 23 switched to the left half position, and the hydraulic pressure in the oil passages c1, c2 is discharged from a drain port EX of the linear solenoid valve SLC2.

Operation in Forward Second Speed

Then, if the forward second speed is judged from the state of the forward first speed by the control unit, in a state where the solenoid valve S11 is set to ON and the solenoid valve S12 to OFF by the electrical command from the control unit as in the case of the forward first speed (except for engine brake), the pressure regulation control of the linear solenoid valve SLB1 is performed while the pressure regulated state of the linear solenoid valve SLC1 is maintained.

When the linear solenoid valve SLB1 is controlled in pressure, the controlled pressure $P_{SLB1}$ as the engaging pressure $P_{B1}$ is output from the output port $S_{LB1b}$ and input to the hydraulic servo 44 via the oil passage f1, and the brake B-1 is locked. Thus, together with the engaging of the clutch C-1, the forward second speed is achieved.

The oil passage f1 is provided with the check valve 54 and the orifice 64. When the engaging pressure $P_{B1}$ is supplied to the hydraulic servo 44 of the brake B-1, the check valve 54 is closed and the hydraulic pressure is slowly supplied only through the orifice 64. When the engaging pressure $P_{B1}$ is discharged from the hydraulic servo 44, the check valve 54 is opened so that the hydraulic pressure is quickly discharged compared to when being supplied. The engaging pressure $P_{B1}$ supplied to the oil passage f1 is input to the oil chamber 34a of the B-1 damper 34 via the oil passage f2. The B-1 damper 34 prevents pulsation of the engaging pressure $P_{B1}$ supplied to and discharged from the hydraulic servo 44, and absorbs the surge pressure (rapid fluctuating pressure).

Operation in Forward Third Speed

Next, if the forward third speed is judged from the state of the forward second speed by the control unit, in a state where the solenoid valve S11 is set to ON and the solenoid valve S12 to OFF by the electric command from the control unit, the linear solenoid valve $S_{LB1}$ is closed in the form of OFF and the pressure regulation control of the linear solenoid valve SLC3 is performed, while the pressure regulated state of the linear solenoid valve SLC1 is maintained.

First, by the pressure regulation control of the linear solenoid valve SLB1, the brake B-1 is release-controlled. More specifically, the engaging pressure $P_{B1}$ (controlled pressure $P_{S1}$) of the hydraulic servo 44 of the brake B-1 is discharge-controlled through the drain port EX of the linear solenoid valve SLB1 via the oil passage f1, and the brake B-1 is released. On the other hand, the linear solenoid valve SLC3 is controlled in pressure from the state of being closed so that the controlled pressure $P_{SLC3}$ becomes 0 after ON (energizing). The controlled pressure $P_{SLC3}$ is output as the engaging pressure $P_{C3}$ from the output port SLC3b, and is input to the hydraulic servo 43 via the oil passage e1, and the clutch C-3 is engaged. Thus, together with the engaging of the clutch C-1, the forward third speed is achieved.

The oil passage e1 is provided with the check valve 53 and the orifice 63. When the engaging pressure $P_{C3}$ is supplied to the hydraulic servo 43 of the clutch C-3, the check valve 53 is closed and the hydraulic pressure is slowly supplied only through the orifice 63. When the engaging pressure $P_{C3}$ is discharged from the hydraulic servo 43, the check valve 53 is opened so that the hydraulic pressure is quickly discharged compared to when being supplied. Further, the engaging pressure $P_{C3}$ supplied to the oil passage e1 is input to the oil chamber 33a of the C-3 damper 33 via the oil passage e2. The C-3 damper 33 prevents pulsation of the engaging pressure $P_{C3}$ supplied to and discharged from the hydraulic servo 43, and absorbs the surge pressure (rapid fluctuating pressure).

Operation in Forward Fourth Speed

If the forward fourth speed is judged from the state of the forward third speed by the control unit, in the state where the solenoid valve S11 is set to ON and the solenoid valve S12 to OFF by the electric command from the control unit, the linear solenoid valve SLC3 is closed in the form of OFF and the pressure regulation control of the linear solenoid valve SLC2 is performed, while the pressure regulated state of the linear solenoid valve SLC1 is maintained.

First, by the pressure regulation control of the linear solenoid valve SLC3, the clutch C-3 is release-controlled. More specifically, the engaging pressure $P_{C3}$ (controlled pressure $P_{SLC3}$) of the hydraulic servo 43 of the clutch C-3 is discharge-controlled from the drain port EX of the linear solenoid valve SLC3 via the oil passage e1, and the clutch C-3 is released. On the other hand, the linear solenoid valve SLC2 is controlled in pressure from the state of being closed so that the controlled pressure $P_{SLC2}$ becomes 0 after ON (energizing). The controlled pressure $P_{SLC2}$ is output as the engaging pressure $P_{C2}$ from the output port SLC2b, and is input to the input port 22f of the second clutch apply relay valve 22 via the oil passage c1.

Since the second clutch apply relay valve 22, with the solenoid valve S11 set to ON and the signal pressure $P_{S1}$ not input to the oil chamber 22a, is locked to the left half position by the engaging pressure $P_{C1}$ input to the oil chamber 22b, the controlled pressure $P_{SLC2}$ (engaging pressure $P_{C2}$) input to the input port 22f is output from the output port 22g as the engaging pressure $P_{C2}$. The engaging pressure $P_{C2}$ output from the output port 22g is input to the input port 23b of the C-2 relay valve 23 via the oil passage c2.

Since the C-2 relay valve 23, with the solenoid valve S12 set to OFF, the B-2 relay valve 24 set to the left half position, and the oil chamber 23a and the oil passage h5 placed in the drain state, is set to the left half position by the biasing force of the spring 23s, the engaging pressure $P_{C2}$ input to the input port 23b is output from the output port 23c, and is also output from the output port 23e. The engaging pressure $P_{C2}$ output from the output port 23c is input to the oil chamber 21d of the first clutch apply relay valve 21 via the oil passage c5, and the spool 21p of the first clutch apply relay valve 21 is switched to the left half position and locked by the engaging pressure $P_{C2}$, together with the biasing force of the spring 21s. At that time, the forward range pressure $P_D$ input to the input port 22e via the oil passage k1 is switched from the output port 21i to output port 21j, and is output as a second preliminary hydraulic pressure $P_{DC2}$ to the oil passage j, however, blocked by the input port 22h of the second clutch apply relay valve 22. Since the first preliminary hydraulic pressure $P_{DC1}$ (forward range pressure $P_D$) supplied to the oil passage k1 is blocked, the supply of the forward range pressure $P_D$ as the lock pressure to the oil chamber 21c via the oil passages k2, k3 is released.

The oil passage c5 is provided with the check valve 55 and the orifice 65. When the engaging pressure $P_{C2}$ is supplied to the oil chamber 21d of the first clutch apply relay valve 21, the check valve 55 is closed, and the hydraulic pressure is slowly supplied only through the orifice 65. When the engaging pressure $P_{C2}$ is discharged from the oil chamber 21d, the check valve 55 is opened so that the hydraulic pressure is discharged more quickly than when being supplied.

The engaging pressure $P_{C2}$ output from the output port 23e of the C-2 relay valve 23 is input to the hydraulic servo 42 via the oil passage c3, and the clutch C-2 is engaged. Thus, together with the engaging of the clutch C-1, the forward fourth speed is achieved.

As described above, the oil passage c2 is provided with the check valve 52 and the orifice 62. In the same manner as in the case of the engine brake of the forward first speed, when the engaging pressure $P_{C2}$ is supplied to the hydraulic servo 42 of the clutch C-2, the check valve 52 is closed and the hydraulic pressure is slowly supplied only through the orifice 62. When the engaging pressure $P_{C2}$ is discharged from the hydraulic servo 42, the check valve 52 is opened so that the hydraulic pressure is discharged more quickly than when being supplied. The engaging pressure $P_{C2}$ supplied to the oil passage c2 is input to the oil chamber 32a of the C2-B2 damper 32 via the oil passage c4. The C2-B2 damper 32 prevents pulsation of the engaging pressure $P_{C2}$ supplied to and discharged from the hydraulic servo 42, and absorbs the surge pressure (rapid fluctuating pressure).

Operation in Forward Fifth Speed

If the forward fifth speed is judged from the state of the forward fourth speed by the control unit, in a state where the solenoid valve S11 is set to ON and the solenoid valve S12 to OFF by the electrical command from the control unit, while the pressure regulated state of the linear solenoid valve SLC2 is maintained, the linear solenoid valve SLC1 is closed in the form of OFF, and the pressure regulation control of the linear solenoid valve SLC3 is performed.

First, by the pressure regulation control of the linear solenoid valve SLC1, the clutch C-1 is release-controlled. More specifically, the engaging pressure $P_{C1}$ (controlled pressure $P_{SLC1}$) of the hydraulic servo 41 of the clutch C-1 is discharge-controlled from the drain port EX of the linear solenoid valve SLC1 via the oil passages b1, b2, and the clutch C-1 is released. On the other hand, in the same manner as in the case of the forward third speed, the linear solenoid valve SLC3 is controlled in pressure from the state of being closed so that the controlled pressure $P_{SLC3}$ becomes 0 after ON (energizing). The controlled pressure $P_{SLC3}$ is output as the engaging pressure $P_{C3}$ from the output port SLC3b, and is input to the hydraulic servo 43 via the oil passage e1, and the clutch C-3 is engaged. Thus, together with the engaging of the clutch C-2, the forward fifth speed is achieved.

Operation in Forward Sixth Speed

If the forward sixth speed is judged from the state of the forward fifth speed by the control unit, in a state where the solenoid valve S11 is set to ON and the solenoid valve S12 to OFF by the electrical command from the control unit, the linear solenoid valve SLC3 is closed in the form of ON (energizing) and the pressure regulation control of the linear solenoid valve SLB1 is performed, while the pressure regulated state of the linear solenoid valve SLC2 is maintained.

First, by the pressure regulation control of the linear solenoid valve SLC3, the clutch C-3 is release-controlled. More specifically, the engaging pressure $P_{C3}$ (controlled pressure $P_{SLC3}$) of the hydraulic servo 43 of the clutch C-3 is discharge-controlled from the drain port EX of the linear solenoid valve SLC3 via the oil passage e1, and the clutch C-3 is released. On the other hand, in the same manner as in the case of the forward second speed, the linear solenoid valve SLB1 is switched ON (energizing) and controlled in pressure, from the state of being closed so that the controlled pressure $P_{SLB1}$ becomes 0 after OFF. The controlled pressure $P_{SLB1}$ is output as the engaging pressure $P_{B1}$ from the output port SLB1b, and is input to the hydraulic servo 44 via the oil passage f1, and the brake B-1 is engaged. Thus, together with the engaging of the clutch C-2, the forward sixth speed is achieved.

Operation in D-N

If a vehicle is decelerated by the driver, down-shifted in accordance with the vehicle speed, and stopped in the state of the forward first speed, and then if the shift lever is changed from the D range position to the N range position, the forward range pressure output port of the manual shift valve is disconnected with the input port and communicated with the drain port, that is, the forward range pressure $P_D$ is drained.

At the same time a shift lever sensor (not illustrated) detects that the shift lever is in the N range position, and if the N range is judged by the control unit in accordance with the shift lever position, the linear solenoid valve SLC2 and the linear solenoid valve SLC3 are set to ON (energized) and the linear solenoid valve SLB1 to OFF, and these controlled pressures $P_{SLC2}$, $P_{SLC3}$, and $P_{SLB1}$ are drained to 0 (non-output state). That is, the hydraulic pressures of the respective hydraulic servos 42, 43, 44 and 45 are drained, and the clutch C-2, the clutch C-3, the brake B-1 and the brake B-2 are released. The solenoid valve S11 is maintained in the ON (energized) state, and the solenoid valve S12 is maintained in the OFF state. That is, signal pressures $P_{S1}$, $P_{S2}$ are not output from both the solenoid valves S11 and S12.

If the clutch C-1 is rapidly released, for example, releasing shock will occur. Therefore, the linear solenoid valve SLC1 performs the pressure regulation control such that the controlled pressure $P_{SLC1}$ is gradually reduced and finally the controlled pressure $P_{SLC1}$ is drained to 0 (non-output state), thereby slowly releasing the clutch C-1. When this clutch C-1 is also released, all clutch brakes of the automatic transmission 3 are released, resulting in a neutral state.

During the release control by the linear solenoid valve SLC1, the accumulator 30 connected to the input port SLC1$a$ of the linear solenoid valve SLC1 via the oil passage a3, etc. maintains the pressure by releasing a hydraulic pressure accumulated during the D range, to the oil passages a1, a3 on the side of the linear solenoid valve SLC1 rather than the orifice 60. Thus, the slow release control of the clutch C-1 by the linear solenoid valve SLC1 is realized. This prevents the release shock from occurring when the D-N shift operation is performed from the forward first speed state.

Operation in Reverse First Speed

If the shift lever is moved to the R range position through the shift lever operation by the driver, the reverse range pressure $P_{REV}$ is output from the reverse range pressure output port of the manual shift valve, and the reverse range pressure $P_{REV}$ is input to the input port 24$d$ of the B-2 relay valve 24 via the oil passage 1, etc.

Further, if the shift lever sensor (not illustrated) detects that the shift lever is at the R range position, and the R range is judged as the shift lever position by the control unit, the solenoid valve S11 is set to ON (energized) and maintained, and the solenoid valve S12 is set to OFF and maintained. That is, since the signal pressure $P_{S2}$ is not output, the B-2 relay valve 24 is maintained at the left half position by the biasing force of the spring 24$s$. By this, the reverse range pressure $P_{REV}$ input to the input port 24$c$ is supplied to the hydraulic servo 45 of the brake B-2 via the output port 24$g$ and the oil passage n, and the brake B-2 is engaged.

The pressure regulation control is performed by the control unit so that the linear solenoid valve SLC3 gradually outputs the controlled pressure $P_{SLC3}$, which is output as the engaging pressure $P_{C3}$ from the output port SLC3$b$ and is input to the hydraulic servo 43 via the oil passage e1. That is, the clutch C-3 is slowly engaged. Thus, together with the locking of the brake B-2, the reverse first speed is achieved.

Note that, when the R range is switched to the N range, in the same manner as in the case of the N range, the engaging pressure $P_{B2}$ of the hydraulic servo 45 of the brake B-2 is drained via the oil passage n, the B-2 relay valve 24, the oil passage 1 and the manual shift valve, and the engaging pressure $P_{C3}$ of the hydraulic servo 43 of the clutch C-3 is drained from the linear solenoid valve SLC3.

If the shift lever is moved to the R range position by the driver and if it is detected that the vehicle speed is more than a predetermined speed in the forward direction, the solenoid valve S12 is switched ON by the control unit, and the ON state (energized state) of the linear solenoid valve SLC3 is maintained. That is, the R range pressure $P_{REV}$ is blocked by the B-2 relay valve 24 so that it will not be supplied to the hydraulic servo 45 of the brake B-2, and the engaging pressure $P_{C3}$ (controlled pressure $P_{SLC3}$) is not supplied to the hydraulic servo 43 of the clutch C-3. Thus, a so-called reverse inhibit function works, and the reverse first speed is prevented from being achieved.

Operation at Solenoid-All-Off Failure

Then, the operation at the solenoid-all-off failure in this hydraulic control device $1_1$ will be described. If all the solenoid valves (linear solenoid valve SLC1, linear solenoid valve SLC2, linear solenoid valve SLC3, linear solenoid valve SLB1, solenoid valve S11, and solenoid valve S12) OFF-fail (hereinafter called "all-off failure") due to down, short-circuit, wire breakage, etc. of the control unit during the normal running with the shift lever position in the D range, the linear solenoid valve SLC1, the linear solenoid valve SLB1 and the solenoid valve S12 output no hydraulic pressure because they are of the normal close type. The linear solenoid valve SLC2, the linear solenoid valve SLC3 and the solenoid valve S11 output respective hydraulic pressures because they are of the normal open type.

During running at the forward first speed to the forward third speed when normal, the first clutch apply relay valve 21 has the spool 21$p$ locked to the right half position by the first preliminary hydraulic pressure $P_{DC1}$ input to the oil chamber 21$c$. For this reason, the first preliminary hydraulic pressure $P_{DC1}$ is input to the input port 22$e$ of the second clutch apply relay valve 22 via the oil passage k1 and is blocked by the second clutch apply relay valve 22 set to the left half position (normal position).

If all-off failure occurs from this state, the second clutch apply relay valve 22 is switched to the right half position (failure position) when the signal pressure $P_{S1}$ output from the solenoid valve S11 is input to the oil chamber 22$a$ via the oil passages h1, h3, and the first preliminary hydraulic pressure $P_{DC1}$ input to the input port 22$e$ is output from the output port 22$d$ and input to the hydraulic servo 41 via the oil passage b2, and the clutch C-1 is engaged. The pressure $P_{SLC2}$ (engaging pressure $P_{C2}$) output from the linear solenoid valve SLC2 of the normal open type is blocked by the input port 22$f$ of the second clutch apply relay valve 22 switched to the right half position. With the linear solenoid valve SLC3 of the normal open type, on the other hand, the line pressure $P_L$ input to the input port SLC3$a$ is, approximately as it is, output as the engaging pressure $P_{C3}$ from the output port SLC3$b$ and input to the hydraulic servo 43 via the oil passage e1, and the clutch C-3 is engaged. By this, the clutch C-1 and the clutch C-3 are engaged and the forward third speed is achieved (see FIG. 2). That is, the running state at the forward third speed is secured when the all-off failure occurs during the running at the forward first speed to the forward third speed.

During normal running at the forward fourth speed to the forward sixth speed, the controlled pressure $P_{SLC2}$ (engaging pressure $P_{C2}$) of the clutch C-2 is input to the oil chamber 21$d$ of the first clutch apply relay valve 21 via the oil passage c1, the second clutch apply relay valve 22, the oil passage c2, the C-2 relay valve 23, and the oil passage c5, and the spools 21*p*, 21*q* are locked to the left half position. Therefore, the second preliminary hydraulic pressure $P_{DC2}$ output from the output port 21*j* is input to the input port 22*h* of the second clutch apply relay valve 22 via the oil passage j, and blocked by the second clutch apply relay valve 22 set to the left half position.

If all-off failure occurs from this state, the second clutch apply relay valve 22 is switched to the right half position when the signal pressure $P_{S1}$ output from the solenoid valve S11 is input to the oil chamber 22*a* via the oil passages h1, h3, and the solenoid valve S12 becomes OFF and the B-2 relay valve 24 is not switched and is maintained at the left half position. Therefore, the oil passage h4 is blocked, and since the signal pressure $P_{S1}$ of the solenoid valve S11 is not output to the oil passage h5, the C-2 relay valve 23 is not switched and is maintained at the left half position. For this reason, the second preliminary hydraulic pressure $P_{DC2}$ input to the input port 22*h* of the second clutch apply relay valve 22 is output from the output port 22*g* and input to the hydraulic servo 42 via the hydraulic pressure c2, the C-2 relay valve 23, and the oil passage c3, and the clutch C-2 is engaged. The pressure $P_{SLC2}$ (engaging pressure $P_{C2}$) output from the linear solenoid valve SLC2 of the normal open type is blocked by the input port 22*f* of the second clutch apply relay valve 22 switched to the right half position. However, since the second preliminary hydraulic pressure $P_{DC2}$ output to the oil passage c2 is also output to the oil passage c5 via the C-2 relay valve 23 and input to the oil chamber 21*d* of the first clutch apply relay valve 21, the first clutch apply relay valve 21 is continuously locked to the left half position. With the linear solenoid valve SLC3 normally opened, the line pressure $P_L$ input to the input port SLC3*a* is, approximately as it is, output as the engaging pressure $P_{C3}$ from the output port SLC3*b* and input to the hydraulic servo 43 via the oil passage e1, and the clutch C-3 is engaged. By this, the clutch C-2 and the clutch C-3 are engaged and the forward fifth speed is achieved (see FIG. 2). That is, the running state at the forward fifth speed is secured when the all-off failure occurs during running at the forward fourth speed to the forward-sixth speed.

When all-off failure occurs during normal running at the forward fourth speed to the forward sixth speed and if the vehicle is stopped and the shift lever is moved to the N range position, the manual shift lever not illustrated stops the output of the forward range pressure $P_D$ and drains. Particularly, the forward range pressure $P_D$ to the linear solenoid valve SLC2 normally opened and to the input port 21*e* of the first clutch apply relay valve 21 is drained. Then, the second preliminary hydraulic pressure $P_{DC2}$ to the oil chamber 21*d* input via the oil passages j, c2, c5 is drained, and the lock by the second preliminary hydraulic pressure $P_{DC2}$ is unlocked. From the solenoid valve S11 normally opened, the signal pressure $P_{S1}$ is continuously output. Therefore, the spools 21*p*, 21*q* of the first clutch apply relay valve 21 are switched to the right half position by the signal pressure $P_{S1}$ input to the oil chamber 21*a*.

In the state of N range when the all-off failure occurs, the line pressure $P_L$ serves as the original pressure, and the controlled pressure $P_{SLC3}$ (engaging pressure $P_{C3}$) that is almost the same as the line pressure $P_L$ is output from the linear solenoid valve SLC3 that is normally opened. Therefore, the clutch C-3 is in an engaged state. Even when the clutch C-3 is engaged, the clutches C-1, C-2 and the brakes B-1, B-2 are in the released state, and even when decelerating rotation is input to the sun gear S2, the sun gear S3 and the carrier CR2 idle. Therefore, an approximately neutral state is established between the input shaft 10 and the counter gear 11 (see FIG. 1).

For example, if the driver moves the shift lever again to the D range position, the forward range pressure $P_D$ is output from the manual shift valve. The forward range pressure $P_D$ is input to the input port 21*e* of the first clutch apply relay valve 21 switched to the right half position, and it is output as the first preliminary hydraulic pressure $P_{DC1}$ from the output port 21*i* to the oil passage k1, and input to the hydraulic servo 41 of the clutch C-1 via the input port 22*e* and the output port 22*d* of the second clutch apply relay valve 22 at the right half position, and the oil passage b2, and the clutch C-1 is engaged. That is, the same state as that at the all-off failure during the running at the forward first speed to the forward third speed occurs, and the forward third speed is secured. This enables restarting of the vehicle even after the vehicle temporarily stops after the all-off failure, and the limp-home function is secured.

With the hydraulic control device $1_1$ according to the present invention, as described above, the clutches C-1, C-2, C-3 are controlled such that they are freely engaged by the controlled pressures $P_{SLC1}$, $P_{SLC2}$, $P_{SLC3}$ of the linear solenoid valves SLC1, SLC2, SLC3, respectively, during normal running. At all-off failure, the controlled pressure $P_{SLC3}$ of the linear solenoid valve SLC3 is supplied to the hydraulic servo 43 of the clutch C-3, and the output state of the first preliminary hydraulic pressure $P_{DC1}$ or the second preliminary hydraulic pressure $P_{DC2}$ is switched based on the engaged state of the clutch C-2 by the first clutch apply relay valve 21. In addition, by the second clutch apply relay valve 22, the first preliminary hydraulic pressure $P_{DC1}$ or the second preliminary hydraulic pressure $P_{DC2}$ can be supplied to the hydraulic servo 41 of the clutch C-1 or the hydraulic servo 42 of the clutch C-2, respectively. When the all-off failure occurs during running, this can achieve the forward third speed or the forward fifth speed in accordance with the shift speed before the occurrence of the all-off failure, with a structure equipped with only two valves, i.e., the first clutch apply relay valve 21 and the second clutch apply relay valve 22, making it possible to achieve compactness and cost reduction.

At the forward fourth speed to the forward sixth speed during normal operation as described above, the controlled pressure $P_{SLC2}$ of the linear solenoid valve SLC2 is supplied as the engaging pressure $P_{C2}$ to the hydraulic servo 42 of the clutch C-2, and also supplied to the oil chamber 21*d* of the first clutch apply relay valve 21. The spools 21*p*, 21*q* of the first clutch apply relay valve 21 are switched to the left half position.

If, for example, the linear solenoid valve SLC2 is formed by a normal close type and when the all-off failure occurs at the forward fourth speed to the forward sixth speed, the output port SLC2*b* of the linear solenoid valve SLC2 is closed and the controlled pressure $P_{SLC2}$ becomes 0. On the other hand, the signal pressure $P_{S1}$ is output from the solenoid valve S11 formed by a normal open type, and input to the oil chamber 21*a* of the first clutch apply relay valve 21.

Since the signal pressure $P_{S1}$ of the solenoid valve S11 is also input to the oil chamber 22*a* of the second clutch apply relay valve 22, for example, if the second clutch apply relay valve 22 is switched to the right half position before the first clutch apply relay valve 21 is switched, the second preliminary hydraulic pressure $P_{DC2}$ supplied to the oil passage j is supplied to the hydraulic servo 42 of the clutch C-2 via the oil passages c2, c3 and also to the oil chamber 21*d* of the first clutch apply relay valve 21 via the oil passage c5. Accordingly, the first clutch apply relay valve 21 is maintained at the left half position (position on high speed side), thus achieving the forward fifth speed as described above, and posing no problem.

If, however, the second clutch apply relay valve 22 is switched later than the switching of the first clutch apply relay valve 21, the controlled pressure $P_{SLC2}$ of the oil chamber 21d of the first clutch apply relay valve 21 becomes 0, and the signal pressure $P_{S1}$ of the solenoid valve S11 is input to the oil chamber 21a. As a result, the first clutch apply relay valve 21 is switched to the right half position (position on low speed side), thus forming the forward third speed as described above, resulting in down-shifting.

To address this, in this hydraulic control device $1_1$, the linear solenoid valve SLC2 is formed by the normal open type. Accordingly, even if the all-off failure occurs in the forward fourth speed to the forward sixth speed, the output port SLC2b of the linear solenoid valve SLC2 opens, and the controlled pressure $P_{SLC2}$ is output approximately equivalent to the forward range pressure $P_D$, that is, the controlled pressure $P_{SLC2}$ input to the oil chamber 21d of the first clutch apply relay valve 21 does not decrease. Even when the signal pressure $P_{S1}$ of the solenoid valve S11 is input to the oil chamber 21a, the controlled pressure $P_{SLC2}$ of the oil chamber 21d and the biasing force of the spring 21s exceed it, and the first clutch apply relay valve 21 can be maintained at the left half position (position on high speed side), making it possible to prevent the malfunction of being switched to the right half position (position on low speed side).

The first clutch apply relay valve 21 is so structured that the forward range pressure $P_D$ (first preliminary hydraulic pressure $P_{DC1}$) that has passed through the valve when at the right half position (position on low speed side) is input to the oil chamber 21c and it is locked to the right half position, and even if the controlled pressure $P_{SLC1}$ of the linear solenoid valve SLC1 decreases due to a pressure regulating operation, etc., it can be maintained at the right half position. For this reason, in the case where the linear solenoid valve SLC2 is formed by the normal close type, if the controlled pressure $P_{SLC2}$ decreases and the spool 21p of the first clutch apply relay valve 21 moves even slightly toward the right half position when the all-off failure occurs in the forward fourth speed to the forward sixth speed, the locking action of the forward range pressure $P_D$ of the oil chamber 21c occurs, and the malfunction of being switched to the right half position tends to occur.

However, in this hydraulic control device $1_1$, because the linear solenoid valve SLC2 is formed by the normal open type as described above, the controlled pressure $P_{SLC2}$ supplied to the oil chamber 21d is prevented from decreasing. Thus, the first clutch apply relay valve 21 can be securely maintained at the left half position (position on high speed side).

Second Embodiment

Figure 5:
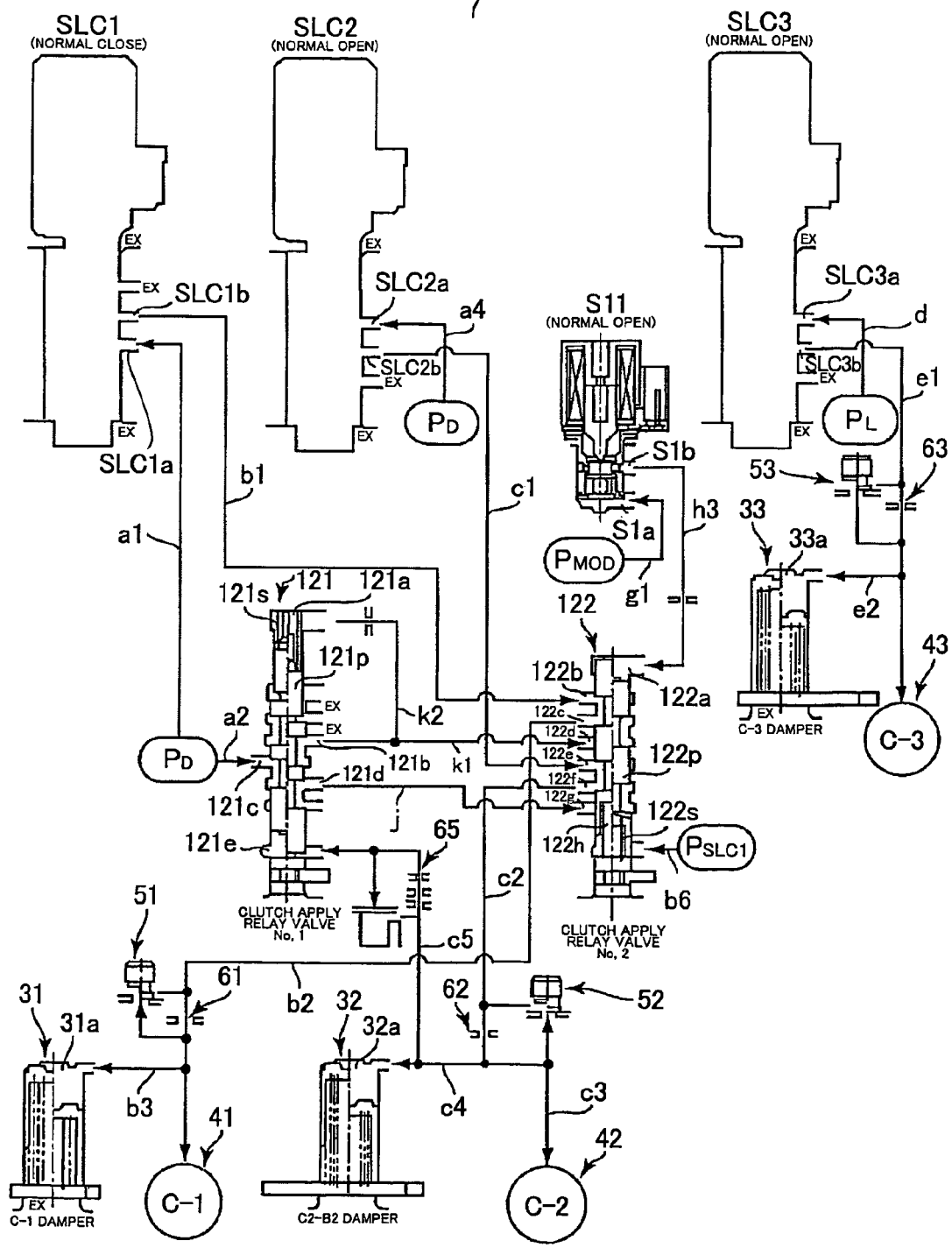
FIG. 5 is a circuit diagram showing a hydraulic control device for an automatic transmission according to a second embodiment.

A second embodiment in which the first embodiment is partially changed will now be described with reference to FIG. 5. Note that, in the second embodiment, only changed portions from the first embodiment are described and the same portions are attached with the same numerals and the description is omitted. For a hydraulic control device $1_2$ shown in FIG. 5, in comparison with the hydraulic control device $1_1$ shown in FIG. 4, the illustration of the linear solenoid valve SLB1, the hydraulic servos 44, 45 of the brakes B-1, B-2, the solenoid valve S12, the C-2 relay valve 23, and the B-2 relay valve 24, etc. is omitted, although the hydraulic control device $1_2$ includes them.

For the hydraulic control device $1_2$ according to the second embodiment, the structures of a first clutch apply relay valve (preliminary shift speed switching valve) 121 and a second clutch apply relay valve (hydraulic pressure supply switching valve) 122 are changed in comparison with the hydraulic control device $1_1$ according to the first embodiment. Especially, in the hydraulic control device $1_1$ according to the first embodiment, the first clutch apply relay valve 21 is switched to the right half position (position on low speed side) based on the engaging pressure $P_{C1}$ (controlled pressure $P_{SLC1}$) of the clutch C-1 and the signal pressure $P_{S1}$ and switched to the left half position (position on high speed side) based on the engaging pressure $P_{C2}$ (controlled pressure $P_{SLC2}$) of the clutch C-2 and the biasing force of the spring 21s. However, the hydraulic control device $1_2$ according to the second embodiment is so structured that the first clutch apply relay valve 121 is switched to the right half position (position on low speed side) based on the biasing force of a spring 121s, and switched to the left half position (position on high speed side) based on the engaging pressure $P_{C2}$ (controlled pressure $P_{SLC2}$) of the clutch C-2.

Detailed Structure of Hydraulic Control Device

In detail, the first clutch apply relay valve 121 in the second embodiment has a spool (first spool) 121p having land portions each formed to be small in diameter on the upper side in the figure and large on the lower side, and the spring (first biasing device) 121s to bias the spool 121p to the lower part in the figure. The first clutch apply relay valve 121 also has an oil chamber 121a at the upper part in the figure of the spool 121p, and an oil chamber (first oil chamber) 121e at the lower part in the figure of the spool 121p, and furthermore, it has an output port 121b, an input port 121c, an output port 121d and a drain port EX.

The first clutch apply relay valve 121 is so structured that, when the spool 121p is shifted to the right half position (position on low speed side), the input port 121c and the output port 121b are communicated, the input port 121c and the output port 121d are disconnected, and the output port 121d and the drain port EX are communicated, and when it is shifted to the left half position (position on high speed side), the input port 121c and the output port 121d are communicated, the input port 121c and the output port 121b are disconnected, and the output port 121b and the drain port EX are communicated.

To the input port 121c, a forward range pressure $P_D$ is input via the oil passage a2. The output port 121b that is communicated with the input port 121c when the spool 121p is at the right half position is connected to an input port 122d of the second clutch apply relay valve 122 via the oil passage k1, and connected to the oil chamber 121a via the oil passage k2. The output port 121d that is communicated with the input port 121c when the spool 121p is at the left half position is connected to an input port 122g of the second clutch apply relay valve 122 via the oil passage j. Then, the oil chamber 121e is connected to the hydraulic servo 42 of the clutch C-2 via the oil passage c5 and the C-2 relay valve 23 not illustrated (see FIG. 4). That is, during normal operation, the oil chamber 121e is connected to the output port SLC2b of the linear solenoid valve SLC2 via the second clutch apply relay valve 122 described later.

On the other hand, the second clutch apply relay valve 122 has a spool (second spool) 122p and a spring (second biasing device) 122s to bias the spool 122p to the upper part in the figure. The second clutch apply relay valve 122 also has an oil chamber (second oil chamber) 122a at the upper part in the figure of the spool 122p, and an oil chamber 122h at the lower part in the figure of the spool 122p, and furthermore, it has an input port 122b, an output port 122c, the input port 122d, an input port 122e, an output port 122f, and the input port 122g.

The second clutch apply relay valve 122 is so structured that, when the spool 122p is shifted to the left half position (normal position), the input port 122b and the output port 122c are communicated, the input port 122e and the output port 122f are communicated, and the input port 122d and the input port 122g are disconnected, and when it is shifted to the right half position (failure position), the input port 122d and the output port 122c are communicated, the input port 122g and the output port 122f are communicated, and the input port 122b and the output port 122c are disconnected.

The oil chamber 122a of the second clutch apply relay valve 122 is connected to the output port S1b of the solenoid valve S11 via the oil passage h3. The oil chamber 122h is connected to the output port SLC1b of the linear solenoid valve SLC1 via an oil passage b6 (illustration partially omitted) connected to the oil passage b1. In the second embodiment, the oil passage h4 (see FIG. 4) is connected directly to the output port S1b of the solenoid valve S1, and the output port S1b is connected to the input port 24c (see FIG. 4) of the B-2 relay valve 24 (illustration omitted).

The input port 122b of the second clutch apply relay valve 122 is connected to the output port SLC1b of the linear solenoid valve SLC1 via the oil passage b1. The output port 122c that is communicated with the input port 122b when the spool 122p is at the left half position and communicated with the input port 122d when the spool 122p is at the right half position is connected to the hydraulic servo 41 of the clutch C-1 via the oil passage b2. On the other hand, the input port 122e is connected to the output port SLC2b of the linear solenoid valve SLC2 via the oil passage c1. The output port 122 that is communicated with the input port 122e when the spool 122p is at the left half position and communicated with the input port 122g when the spool 122p is at the right half position is connected to the hydraulic servo 42 of the clutch C-2 via the oil passage c2, the C-2 relay valve 23 not illustrated, and the oil passage c3.

Operation of Hydraulic Control Device During Normal Operation

If, for example, the driver turns the ignition ON, the solenoid valve S11 is switched ON by the electrical command from the control unit during normal operation. Since the signal pressure $P_{S1}$ is not output, the second clutch apply relay valve 122 is set to the left half position based on the biasing force of the spring 122s, and since the input port 122b and the output port 122c, and the input port 122e and the output port 122f are communicated respectively, the controlled pressure $P_{SLC1}$ of the linear solenoid valve SLC1 and the controlled pressure $P_{SLC2}$ of the linear solenoid valve SLC2 b are freely supplied to the hydraulic servo 41 of the clutch C-1 and the hydraulic servo 42 of the clutch C-2, respectively.

If the shift lever is changed from the N range position to the D range position by the driver, and the forward first speed to the forward third speed is judged by the control unit, the forward range pressure $P_D$ is output to the oil passages a1 to a5 from the forward range pressure output port of the manual shift valve, and the forward range pressure $P_D$ is input from the oil passage a2 to the input port 121c of the first clutch apply relay valve 121. Then, the first clutch apply relay valve 121 is shifted to the right half position by the biasing force of the spring 121s because the controlled pressure $P_{SLC2}$ is not output from the linear solenoid valve SLC2 (not input to the oil chamber 121e) in the forward first speed to the forward third speed (see FIG. 2), and the forward range pressure $P_D$ is output as the first preliminary hydraulic pressure $P_{DC1}$ from the output port 121b to the oil passage k1. However, the second clutch apply relay valve 122, which has been shifted to the left half position by the biasing force of the spring 122s because the solenoid valve S11 is set to ON and the signal pressure $P_{S1}$ is not output, is disconnected at the input port 122d. At that time, the first preliminary hydraulic pressure $P_{DC1}$ (forward range pressure $P_D$) is input to the oil chamber 121a via the oil passage k2 and the spool 121p is stably held at the left half position. The hydraulic pressure (second preliminary hydraulic pressure $P_{DC2}$) in the oil passage j is drained because the output port 121d and the drain port EX are communicated.

The hydraulic control of the clutch C-1 by the linear solenoid valve SLC1, hydraulic control of the brake B-2 by the linear solenoid valve SLC2, hydraulic control of the brake B-1 by the linear solenoid valve SLB1 and hydraulic control of the clutch C-3 by the linear solenoid valve SLC3 are performed as in the case of the first embodiment described above, thereby achieving the forward first speed to the forward third speed appropriately.

If the forward fourth speed to the forward sixth speed is judged by the control unit, engagement of the clutch C-2 is judged, and pressure regulation control of the linear solenoid valve SLC2 is performed, and the controlled pressure $P_{SLC2}$ is output from the linear solenoid valve SLC2. Then, the controlled pressure $P_{SLC2}$ is input to the oil chamber 121e of the first clutch apply relay valve 121 via the oil passage c1, the second clutch apply relay valve 122, the oil passage c2, the C-2 relay valve 23 (see FIG. 4) and the oil passage c5. Thus, the spool 121p of the first clutch apply relay valve 121 is switched to the left half position because the controlled pressure $P_{SLC2}$ of the oil chamber 121e having a pressure receiving area of a large diameter prevails against the first preliminary hydraulic pressure $P_{DC1}$ (forward range pressure $P_D$) of the oil chamber 121a having a pressure receiving area of a small diameter and the biasing force of the spring 121s. For this reason, the forward range pressure $P_D$ is output as a second preliminary hydraulic pressure $P_{DC2}$ to the oil passage j from the output port 121d. However, since the second clutch apply relay valve 122 has been shifted to the left half position by the biasing force of the spring 122s as described above, it is disconnected at the input port 122g. The hydraulic pressure (first preliminary hydraulic pressure $P_{DC1}$) in the oil passages k1, k2 and the oil chamber 121a is drained because the output port 121b and the drain port EX are communicated.

The hydraulic control of the clutch C-1 by the linear solenoid valve SLC1, hydraulic control of the clutch C-3 by the linear solenoid valve SLC3, and hydraulic control of the brake B-1 by the linear solenoid valve SLB1 are performed as in the case of the first embodiment described above, thereby achieving the forward fourth speed to the forward sixth speed appropriately.

Operation at Solenoid-All-Off Failure

Then, the operation at the solenoid-all-off failure in this hydraulic control device $1_2$ will be described. For example, if the all-off failure occurs due to down, short-circuit, wire breakage, etc. of the control unit, the linear solenoid valve SLC1, the linear solenoid valve SLB1 and the solenoid valve S12 do not output the hydraulic pressure because they are of the normal close type, and the linear solenoid valve SLC2, the linear solenoid valve SLC3, and the solenoid valve S11 output the hydraulic pressure because they are of the normal open type.

During normal running at the forward first speed to the forward third speed, the first clutch apply relay valve 121 has the spool 121p locked to the right half position by the first preliminary hydraulic pressure $P_{DC1}$ input to the oil chamber 121a as described above. For this reason, the first preliminary hydraulic pressure $P_{DC1}$ output from the output port 121b is input to the input port 122d of the second clutch apply relay valve 122 via the oil passage k1, and is blocked by the second clutch apply relay valve 122 shifted to the left half position (normal position).

If all-off failure occurs from this state, the second clutch apply relay valve 122 is switched to the right half position (failure position) as the signal pressure $P_{S1}$ output from the solenoid valve S11 is input to the oil chamber 122a via the oil passage h3, and the first preliminary hydraulic pressure $P_{DC1}$ input to the input port 122d is output from the output port 122c and input to the hydraulic servo 41 via the oil passage b2, and the clutch C-1 is engaged. The pressure $P_{SLC2}$ output from the linear solenoid valve SLC2 normally opened is blocked by the input port 122e of the second clutch apply relay valve 122 switched to the right half position. On the other hand, in the linear solenoid valve SLC3 normally opened, the line pressure $P_L$ input to the input port SLC3a is output as engaging pressure $P_{C3}$, approximately as it is, from the output port SLC3b, and input to the hydraulic servo 43 via the oil passage e1, and the clutch C-3 is engaged. Thus, the clutch C-1 and the clutch C-3 are engaged, achieving the forward third speed (see FIG. 2). That is, when the all-off failure occurs during running at the forward first speed to the forward third speed, the running state at the forward third speed is secured.

During the normal running at the forward fourth speed to the forward sixth speed, as described above, the controlled pressure $P_{SLC2}$ (engaging pressure $P_{C2}$) of the clutch C-2 is input to the oil chamber 121e of the first clutch apply relay valve 121 via the oil passage c1, the second clutch apply relay valve 122, the oil passage c2, the C-2 relay valve 23 (see FIG. 4), and the oil passage c5, and the spool 121p is locked to the left half position. Therefore, the second preliminary hydraulic pressure $P_{DC2}$ output from the output port 121d is input to the input port 122g of the second clutch apply relay valve 122 via the oil passage j, and is blocked by the second clutch apply relay valve 122 shifted to the left half position.

If all-off failure occurs from this state, the second clutch apply relay valve 122 is switched to the right half position as the signal pressure $P_{S1}$ output from the solenoid valve S11 is input to the oil chamber 122a via the oil passage h3, and the second preliminary hydraulic pressure $P_{DC2}$ input to the input port 122g is output from the output port 122f, and input to the hydraulic servo 42 via the oil passage c2, the C-2 relay valve 23 (see FIG. 4) and the oil passage c3, and the clutch C-2 is engaged. The pressure $P_{SLC2}$ (engaging pressure $P_{C2}$) output from the linear solenoid valve SLC2 normally opened is blocked by the input port 122e of the second clutch apply relay valve 122 switched to the right half position. However, since the second preliminary hydraulic pressure $P_{DC2}$ output to the oil passage c2 is also output to the oil passage c5 and input to the oil chamber 121e of the first clutch apply relay valve 121, the first clutch apply relay valve 121 is continuously locked to the left half position. With the linear solenoid valve SLC3 normally opened, the line pressure $P_L$ input to the input port SLC3a is output as the engaging pressure $P_{C3}$, approximately as it is, from the output port SLC3b and input to the hydraulic servo 43 via the oil passage e1, and the clutch C-3 is engaged. By this, the clutch C-2 and the clutch C-3 are engaged, achieving the forward fifth speed (see FIG. 2). That is, the running state at the forward fifth speed is secured when the all-off failure occurs during the running at the forward fourth speed to the forward sixth speed.

If all-off failure occurs during normal running at the forward fourth speed to the forward sixth speed and when the vehicle is stopped and the shift lever is moved to the N range position, the manual shift valve not illustrated stops the output of the forward range pressure $P_D$ and drains it. Especially the forward range pressure $P_D$ to the linear solenoid valve SLC2 normally opened and to the input port 121c of the first clutch apply relay valve 121 is drained. Then, the second preliminary hydraulic pressure $P_{DC2}$ input to the oil chamber 121e via the oil passages j, c2, c5 is drained, the lock by the second preliminary hydraulic pressure $P_{DC2}$ is unlocked, and the spool 121p is switched to the right half position by the biasing force of the spring 121s. Since the signal pressure $P_{S1}$ continues to be output from the solenoid valve S11 normally opened, the second clutch apply relay valve 122 is left at the right half position by the signal pressure $P_{S1}$ continuously input to the oil chamber 122a.

In the N range state at the all-off failure, since the line pressure $P_L$ serves as the original pressure, and the controlled pressure $P_{SLC3}$ (engaging pressure $P_{C3}$) approximately the same as the line pressure $P_L$ is output from the linear solenoid valve SLC3 normally opened, the clutch C-3 is in an engaged state. Even when the clutch C-3 is engaged, the clutches C-1, C-2 and the brakes B-1, B-2 are in a released state, and even when decelerated rotation is input to the sun gear S2, the sun gear S3 and the carrier CR2 are idled. Therefore, an approximate neutral state is established between the input shaft 10 and the counter gear 11 (see FIG. 1).

If the shift lever is moved again to the D range position by the driver, the forward range pressure $P_D$ is output from the manual shift valve, and the forward range pressure $P_D$ is input to the input port 121c of the first clutch apply relay valve 121 switched to the right half position, and output as the first preliminary hydraulic pressure $P_{DC1}$ from the output port 121b to the oil passage k1, and input to the hydraulic servo 41 of the clutch C-1 via the input port 122d and the output port 122c of the second clutch apply relay valve 122 at the right half position, and the oil passage b2, and the clutch C-1 is engaged. That is, the same state occurs as in the all-off failure during the running at the forward first speed to the forward third speed, and the forward third speed is secured. This makes it possible to restart the vehicle even after the vehicle is stopped once after the all-off failure, and secure the limp-home function.

As described above, in the hydraulic control device $1_2$ according to the present invention, the clutches C-1, C-2 and C-3 are controlled such that they are freely engaged by the controlled pressures $P_{SLC1}$, $P_{SLC2}$ and $P_{SLC3}$ by means of the linear solenoid valves SLC1, SLC2, and SLC3, respectively, during normal running. At the all-off failure, the controlled pressure $P_{SLC3}$ of the linear solenoid valve SLC3 is supplied to the hydraulic servo 43 of the clutch C-3, and the output state of the first or second preliminary hydraulic pressure $P_{DC1}$, $P_{DC2}$ is switched in accordance with the engaged state of the clutch C-2 by means of the first clutch apply relay valve 121, making it possible to supply the first or second preliminary hydraulic pressure $P_{DC1}$, $P_{DC2}$ to the hydraulic servo 41 of the clutch C-1 or to the hydraulic servo 42 of the clutch C-2 by means of the second clutch apply relay valve 122. This makes it possible to achieve the forward third speed or the forward fifth speed in accordance with the shift speed before the all-off failure occurs when it occurs during running, with a structure equipped with only two valves, i.e., the first clutch apply relay valve 121 and the second clutch apply relay valve 122, thus realizing compactness and cost reduction.

With the hydraulic control device $1_2$ according to the second embodiment, the spool 121p of the first clutch apply relay valve 121 is shifted to the right half position (position on low speed side) by the biasing force of the spring 121s at the forward first speed to the forward third speed (shift speed on low speed side) with the clutch C-2 not engaged. At the forward fourth speed to the forward sixth speed (shift speed on high speed side) with the clutch C-2 engaged, the spool 121p is shifted to the left half position (position on high speed side) by the engaging pressure $P_{C2}$ of the clutch C-2 of the oil chamber 121e against the biasing force of the spring 121s. This makes it possible to supply the first preliminary hydraulic pressure $P_{DC1}$ to the hydraulic servo 41 of the clutch C-1 when the all-off failure occurs while at the right half position, and to supply the second preliminary hydraulic pressure $P_{DC2}$ to the hydraulic servo 42 of the clutch C-2 when the all-off failure occurs while at the left half position.

The first clutch apply relay valve 121 can switch to the right half position (position on low speed side) or to the left half position (position on high speed side) only by the force relationship between the engaging pressure $P_{C2}$ of the clutch C-2 input to the oil chamber 121e and the biasing force of the spring 121s. Therefore, the oil passage b4 to introduce the engaging pressure $P_{C1}$ of the clutch C-1 and the oil passage h2 to introduce the signal pressure $P_{S1}$ are not required (see FIG. 4), making it possible to adopt a simple oil passage structure, in comparison with, for example, a device (e.g. the hydraulic control device $1_1$ in the first embodiment) to input the engaging pressure $P_{C1}$ of the clutch C-1 and the engaging pressure $P_{C2}$ of the clutch C-2 to the spool 121p from mutually opposing directions, thus switching to the right half position or left half position by the force relationship between them. In addition, the oil chamber 21b to which the engaging pressure $P_{C1}$ of the clutch C-1 is input, the spool 21q, and the spring 21t are not required (see FIG. 4), making it possible to shorten the length of the first clutch apply relay valve 121, thus realizing further compactness and cost reduction.

When restarting the vehicle in the state of the all-off failure occurring, the first clutch apply relay valve 121 is switched to the right half position (position on low speed side) based on the biasing force of the spring 121s and the second clutch apply relay valve 122 is switched to the right half position (failure position). As a result, the first preliminary hydraulic pressure $P_{DC1}$ is supplied to the hydraulic servo 41 of the clutch C-1, and therefore, the forward third speed is achieved and the vehicle can be restarted.

To be specific, since the first clutch apply relay valve 121 inputs the forward range pressure $P_C$ as the original pressure of the first and second preliminary hydraulic pressures $P_{DC1}$, $P_{DC2}$, when restarting the vehicle in the state of all-off failure occurring, if the manual shift valve is switched to the neutral (N) range and the forward range pressure $P_D$ is discharged, and then it is switched again to the forward (D) range for example, the first preliminary hydraulic pressure $P_{DC1}$ is supplied to the hydraulic servo 41 of the clutch C-1, thereby achieving the forward third speed and restarting the vehicle. This makes it possible to eliminate the necessity of separate operation such as stopping the engine once when restarting the vehicle in the state of all-off failure occurring.

Since the solenoid valve S11 of the normal open type to be energized during normal running or to output the signal pressure $P_{S1}$ during non-energizing is provided, the second clutch apply relay valve 122 can be switched to the left half position (normal position) by the biasing force of the spring 122s or to the right half position (failure position) by the signal pressure $P_{S1}$ of the solenoid valve S11 input to the oil chamber 122a.

In the hydraulic control device $1_2$ in the second embodiment as well, the controlled pressure $P_{SLC2}$ of the linear solenoid valve SLC2 is supplied to the oil chamber 121e of the first clutch apply relay valve 121, and the spool 121p is thereby switched to the left half-position at the forward fourth speed to the forward sixth speed during normal operation. If the linear solenoid valve SLC2 is formed by the normal close type, when the all-off failure occurs at the forward fourth speed to the forward sixth speed, the signal pressure PSI is output from the solenoid valve S11 formed by the normal open type. As a result, before the second clutch apply relay valve 122 is switched to the right-half position, the output port SLC2b of the linear solenoid valve SLC2 is closed, and the controlled pressure $P_{SLC2}$ may be reduced. That is, if the controlled pressure $P_{SLC2}$ of the oil chamber 121e is reduced before the second preliminary hydraulic pressure $P_{DC2}$ is supplied to the oil chamber 121e, the first clutch apply relay valve 121 is switched to the right half position (position on low speed side) by the biasing force of the spring 121s, and the forward third speed is formed as described above, resulting in down-shifting.

That is, if the linear solenoid valve SLC2 is formed by the normal open type in the hydraulic control device $1_2$ of the second embodiment as well and when all-off failure occurs at the forward fourth speed to the forward sixth speed, the output port SLC2b of the linear solenoid valve SLC2 opens and the controlled pressure $P_{SLC2}$ approximately equivalent to the forward range pressure $P_D$ is output. Therefore, the controlled pressure $P_{SLC2}$ input to the oil chamber 121e of the first clutch apply relay valve 121 does not decrease, and the controlled pressure $P_{SLC2}$ of the oil chamber 121e does not become lower than the biasing force of the spring 121s, thus making it possible to maintain the first clutch apply relay valve 121 at the left half position (position on high speed side) and prevent such malfunction that it is switched to the right half position (position on low speed side).

In the first and second embodiments described above, the hydraulic control devices $1_1$, $1_2$ for the automatic transmission are applied, as an example, to the automatic transmission 3 that achieves six forward speeds and one reverse speed. However, the application is not limited to this, and for example, the hydraulic control devices $1_1$, $1_2$ can be applied to an automatic transmission that achieves eight forward speeds, and the present invention can be applied to any automatic transmission so long as it is a multi-speed automatic transmission.

A hydraulic control device for an automatic transmission according to the present invention can be used for an automatic transmission installed in a passenger vehicle, truck, bus, agricultural machinery, etc. While the hydraulic control device achieves low speed or high speed at the occurrence of all-off failure based on the shift speed before the occurrence of the all-off failure, it is suitable for use in an automatic transmission requiring compactness and cost reduction.

According to an exemplary aspect of the invention, it is possible to control the first to third friction engagement elements in an engageable manner by the first to third hydraulic pressures of the first to third solenoid valves during normal running, and at a failure resulting in non-energizing, the third hydraulic pressure of the third solenoid valve is supplied to the hydraulic servo of the third friction engagement element, and the output state of the first or second preliminary hydraulic pressures is switched by the preliminary shift speed switching valve based on the engaged state of the second friction engagement element, and the first or second preliminary hydraulic pressure can be supplied to the hydraulic servo of first or second friction engagement element by the hydraulic pressure supply switching valve. If a failure that results in non-energizing occurs, a low speed or a high speed can be achieved in accordance with the shift speed before the occurrence of the failure with just a structure equipped with two valves, i.e., the preliminary shift speed switching valve and the hydraulic pressure supply switching valve, making it possible to achieve compactness and cost reduction.

According to an exemplary aspect of the invention, the first spool of the preliminary shift speed switching valve is shifted to the low speed side position by the biasing force of the first biasing device at a low speed side shift speed with the second friction engagement element not engaged, while it is shifted to the high speed side position by the engaging hydraulic pressure of the second friction engagement element of the first oil chamber against the biasing force of the first biasing device at a high speed side shift speeds with the second friction engagement element engaged. This makes it possible to supply the first preliminary hydraulic pressure to the hydraulic servo of the first friction engagement element when a failure that results in non-energizing occurs at the low seed side shift speed, and to supply the second preliminary hydraulic pressure to the hydraulic servo of the second friction engagement element when a failure that results in non-energizing occurs at the high speed side shaft speed.

The preliminary shift speed switching valve can switch to the low speed side position and the high speed side position simply by the force relationship between the engaging hydraulic pressure of the second friction engagement element input to the first oil chamber and the biasing force of the first biasing device. Therefore, a simple oil passage structure can be made and the length of the preliminary shift speed switching valve can be shortened, in comparison with a device to input the engaging hydraulic pressure of the first friction engagement element and the engaging hydraulic pressure of the second friction engagement element to the spool in a mutually opposing way so as to switch to the low speed side position and the high-speed side position by means of the force relationship between them, further promoting the compactness and cost reduction.

According to an exemplary aspect of the invention, since the second solenoid valve is formed by the normal open type that outputs the second hydraulic pressure during non-energizing, the second hydraulic pressure does not decrease even when a failure that results in non-energizing occurs at a high speed side shift speeds. Further, since the second hydraulic pressure input to the first oil chamber of the preliminary shift speed switching valve does not become smaller than the biasing force of the first biasing device, the preliminary shift speed switching valve can be maintained at the high speed side position. Thus, malfunction of the preliminary shift speed-switching valve being switched to a low speed side position can be prevented.

According to an exemplary aspect of the invention, when restarting under a failure that results in non-energizing, the preliminary shift speed switching valve is switched to the low speed side position based on the biasing force of the first biasing device and the hydraulic pressure supply switching valve is switched to the failure position. Thus, the first preliminary hydraulic pressure is supplied to the hydraulic servo of the first friction engagement element. Therefore, the low speed is achieved, making it possible to restart the vehicle.

According to an exemplary aspect of the invention, since the preliminary shift speed switching valve is inputted the forward range pressure as the original pressure of first and second preliminary hydraulic pressures, when restarting under a failure that results in non-energizing, the range switching valve is switched to another range to discharge the forward range pressure, and then switched again to the forward range. As a result, the first preliminary hydraulic pressure is supplied to the hydraulic servo of the first friction engagement element, and a low speed is achieved, thus making it possible to restart the vehicle. This eliminates separate operations such as temporary stop of the engine when restarting under the failure that results in non-energizing.

According to an exemplary aspect of the invention, since the fourth solenoid valve formed by the normal open type that is energized during normal running and outputs the signal hydraulic pressure during non-energizing is provided, it is possible to switch the hydraulic pressure supply switching valve to the normal position by the biasing force of the second biasing device and to the failure position by the signal hydraulic pressure of the fourth solenoid valve input to the second oil chamber.

What is claimed is:

1. A hydraulic control device for an automatic transmission, comprising:
    a first solenoid valve that supplies a first operating hydraulic pressure to a hydraulic servo of a first friction engagement element;
    a second solenoid valve that supplies a second operating hydraulic pressure to a hydraulic servo of a second friction engagement element;
    a third solenoid valve that supplies a third operating hydraulic pressure to a hydraulic servo of a third friction engagement element and is a normally open solenoid valve that outputs the third operating hydraulic pressure during non-energizing;
    a preliminary shift speed switching valve that switches to a low speed side position in order to output a first preliminary hydraulic pressure for the hydraulic servo of the first friction engagement element and a high speed side position in order to output a second preliminary hydraulic pressure for the hydraulic servo of the second friction engagement element based on an engaged state of the second friction engagement element; and
    a hydraulic pressure supply switching valve that switches to a normal position that supplies the first and second operating hydraulic pressures to the hydraulic servos of the first and second friction engagement elements, respectively, and a failure position that supplies the first and second preliminary hydraulic pressures to the hydraulic servos of the first and second friction engagement elements, respectively, at a failure resulting in non-energizing,
    wherein the second friction engagement element is engaged at high speed side shift speeds, a low speed that is one of low speed side shift speeds is achieved by engagement of the first friction engagement element and the third friction engagement element, and a high speed that is one of the high speed side shift speeds is achieved by engagement of the second friction engagement element and the third friction engagement element.

2. The hydraulic control device for the automatic transmission according to claim 1, wherein:
    the preliminary shift speed switching valve includes a spool, a biasing device that biases the spool to the low speed side position, and an oil chamber that switches the spool to the high speed side position against a biasing force of the biasing device by inputting a hydraulic pressure of the hydraulic servo of the second friction engagement element;
    if a failure that results in non-energizing occurs in the low speed side shift speeds, the preliminary shift speed switching valve is switched to the low speed side position based on the biasing force of the biasing device and the hydraulic pressure supply switching valve is switched to the failure position, such that the first preliminary hydraulic pressure is supplied to the hydraulic servo of the first friction engagement element; and
    if the failure that results in non-energizing occurs in the high speed side shift speeds, the preliminary shift speed switching valve is switched to the high speed side position based on the hydraulic pressure of the oil chamber and the hydraulic pressure supply switching valve is switched to the failure position, thus the second preliminary hydraulic pressure is supplied to the hydraulic servo of the second friction engagement element.

3. The hydraulic control device for the automatic transmission according to claim 2, wherein the second solenoid valve is a normally open solenoid valve that outputs the second operating hydraulic pressure during non-energizing.

4. The hydraulic control device for the automatic transmission according to claim 3, wherein, when restarting under the failure that results in non-energizing, the preliminary shift speed switching valve is switched to the low speed side position based on the biasing force of the biasing device and the hydraulic pressure supply switching valve is switched to the failure position, such that the first preliminary hydraulic pressure is supplied to the hydraulic servo of the first friction engagement element.

5. The hydraulic control device for the automatic transmission according to claim 4, further comprising:
   a range switching valve that outputs a line pressure as a forward range pressure in a forward range and discharges the forward range pressure in another range, wherein:
   the preliminary shift speed switching valve is inputted the forward range pressure as an original pressure of the first and second preliminary hydraulic pressures, and
   when restarting under the failure that results in non-energizing, the range switching valve is switched to the another range to discharge the forward range pressure, and then switched again to the forward range, so that the preliminary shift speed switching valve is switched to the low speed side position based on the biasing force of the biasing device, the hydraulic pressure supply switching valve is switched to the failure position, and the first preliminary hydraulic pressure is supplied to the hydraulic servo of the first friction engagement element.

6. The hydraulic control device for the automatic transmission according to claim 1, further comprising:
   a fourth solenoid valve that is a normally open solenoid valve that is energized during normal running and outputs a signal hydraulic pressure during non-energizing,
   wherein the hydraulic pressure supply switching valve includes a spool, a biasing device that biases the spool to the normal position, and an oil chamber that switches the spool to the failure position against the biasing force of the biasing device by inputting the signal hydraulic pressure of the fourth solenoid valve.

7. The hydraulic control device for the automatic transmission according to claim 2, wherein when restarting under the failure that results in non-energizing, the preliminary shift speed switching valve is switched to the low speed side position based on the biasing force of the biasing device and the hydraulic pressure supply switching valve is switched to the failure position, such that the first preliminary hydraulic pressure is supplied to the hydraulic servo of the first friction engagement element.

8. The hydraulic control device for the automatic transmission according to claim 7, further comprising:
   a range switching valve that outputs a line pressure as a forward range pressure in a forward range and discharges the forward range pressure in another range, wherein:
   the preliminary shift speed switching valve is inputted the forward range pressure as an original pressure of the first and second preliminary hydraulic pressures, and
   when restarting under a failure that results in non-energizing, the range switching valve is switched to the another range to discharge the forward range pressure, and then switched again to the forward range, so that the preliminary shift speed switching valve is switched to the low speed side position based on a biasing force of a biasing device of the preliminary shift speed switching valve, the hydraulic pressure supply switching valve is switched to the failure position, and the first preliminary hydraulic pressure is supplied to the hydraulic servo of the first friction engagement element.

* * * * *